Aug. 23, 1938.   C. A. FUCHS   2,127,508
TYPEWRITING MACHINE
Filed Jan. 29, 1935   17 Sheets-Sheet 1
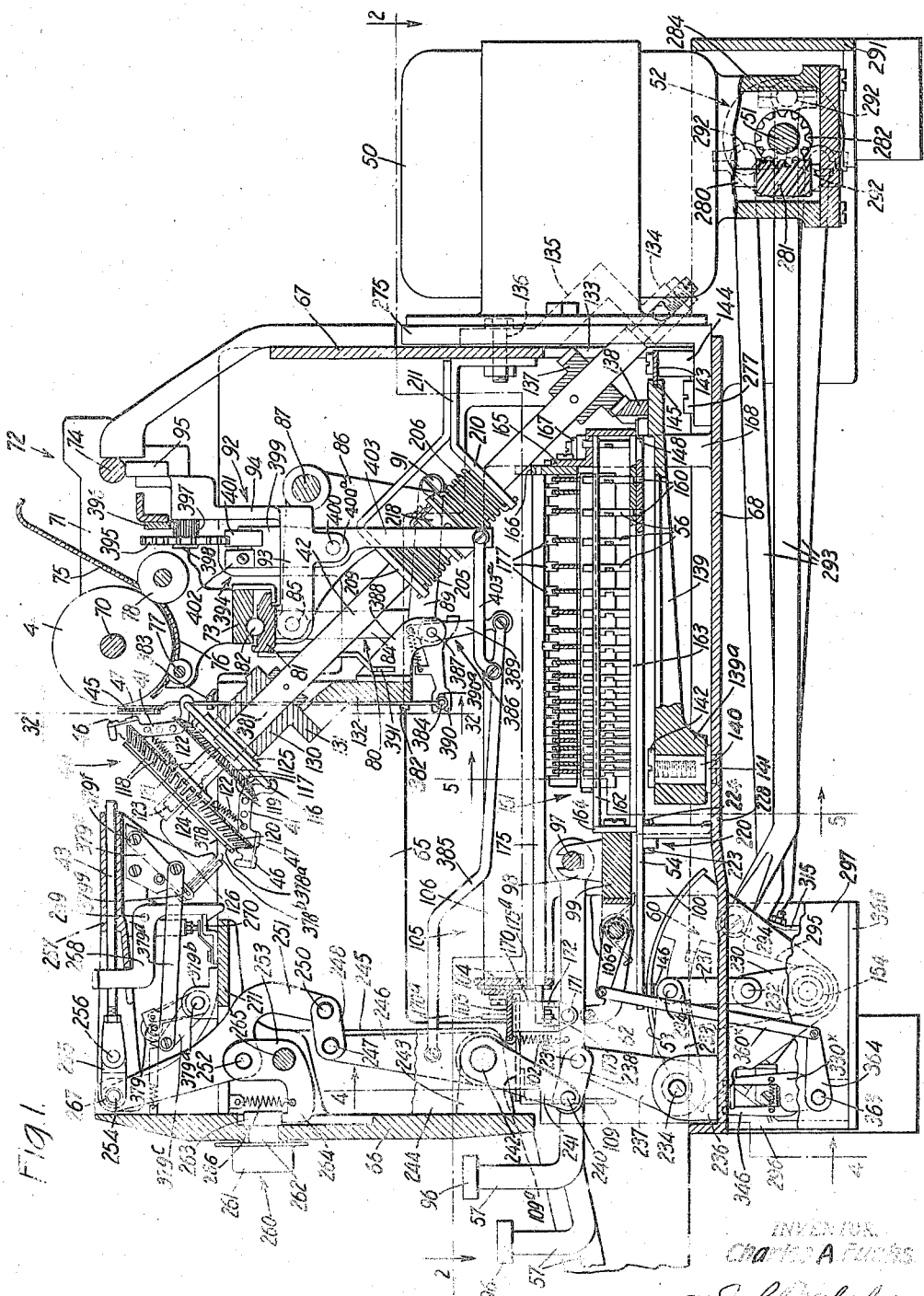
INVENTOR
Charles A Fuchs
BY John Waldheim
ATTORNEY

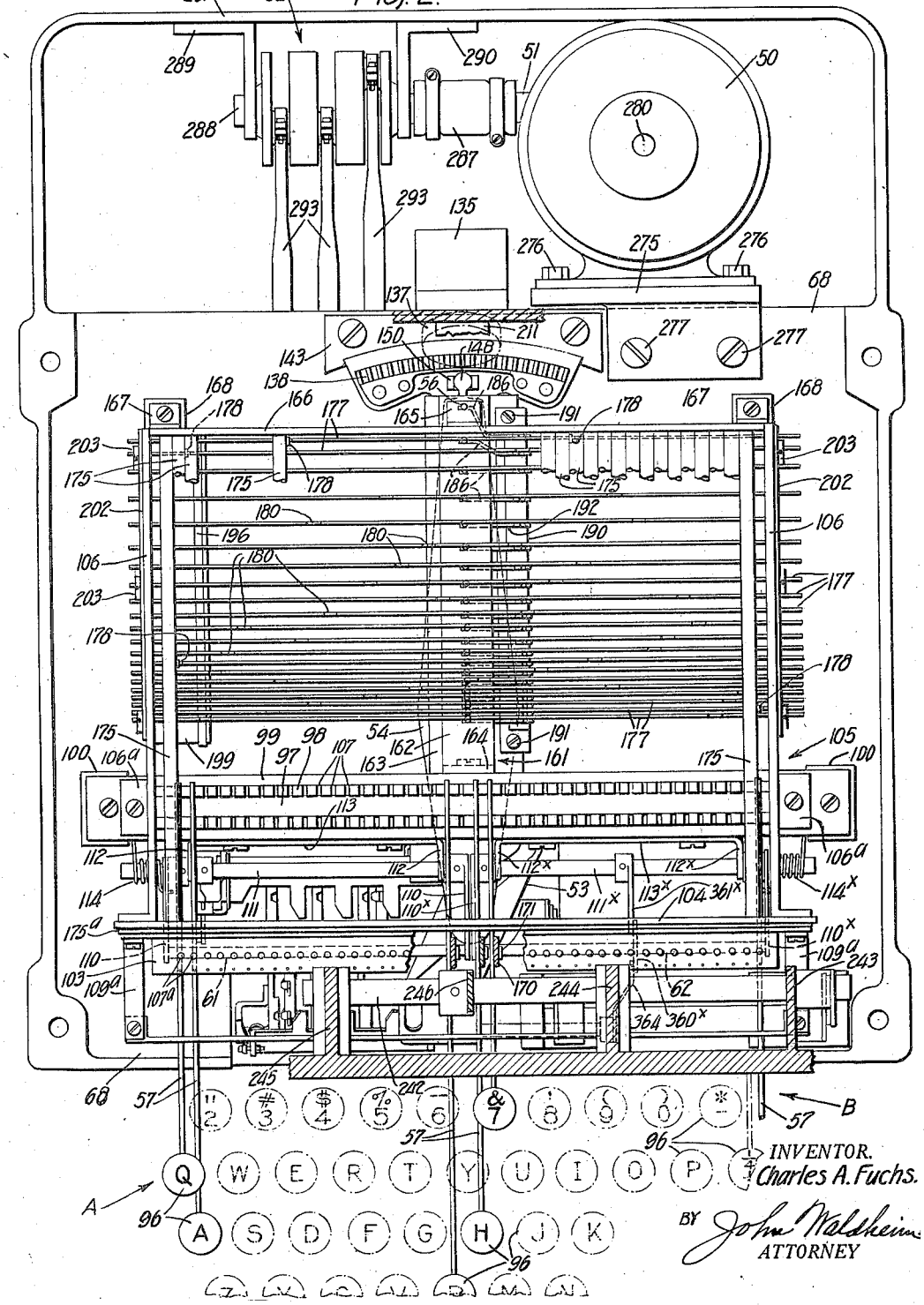

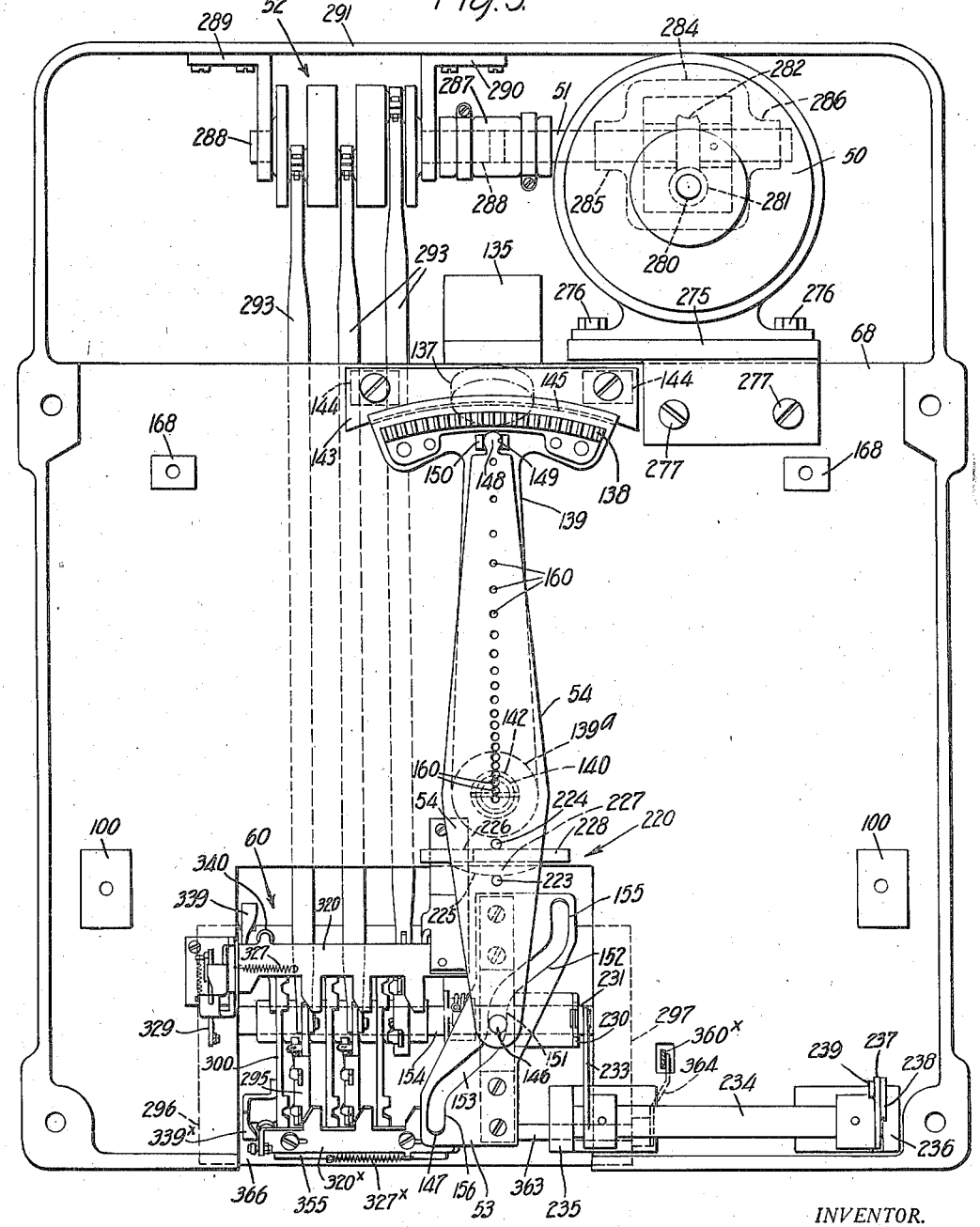

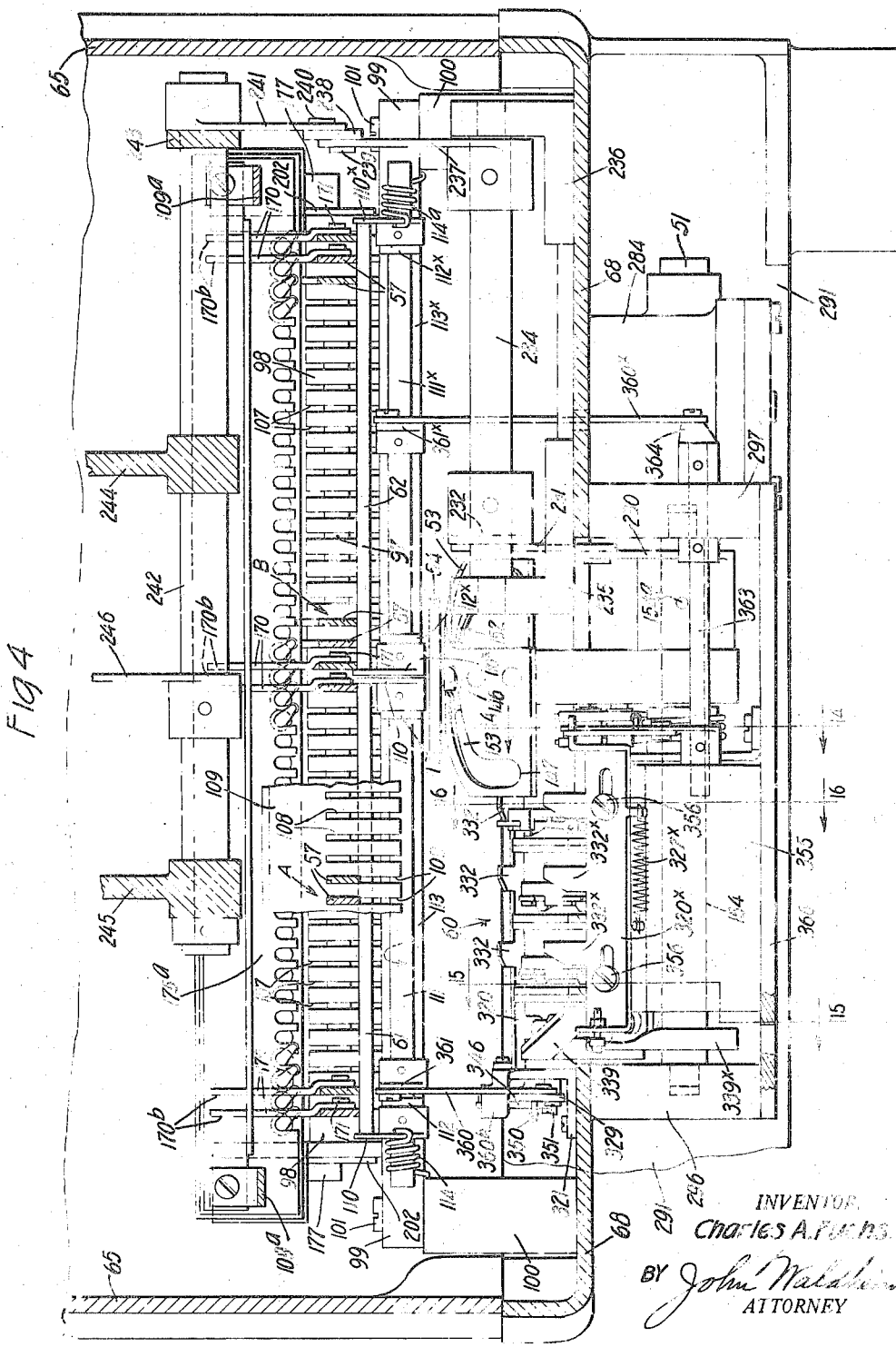

Aug. 23, 1938.   C. A. FUCHS   2,127,508
TYPEWRITING MACHINE
Filed Jan. 29, 1935   17 Sheets-Sheet 5
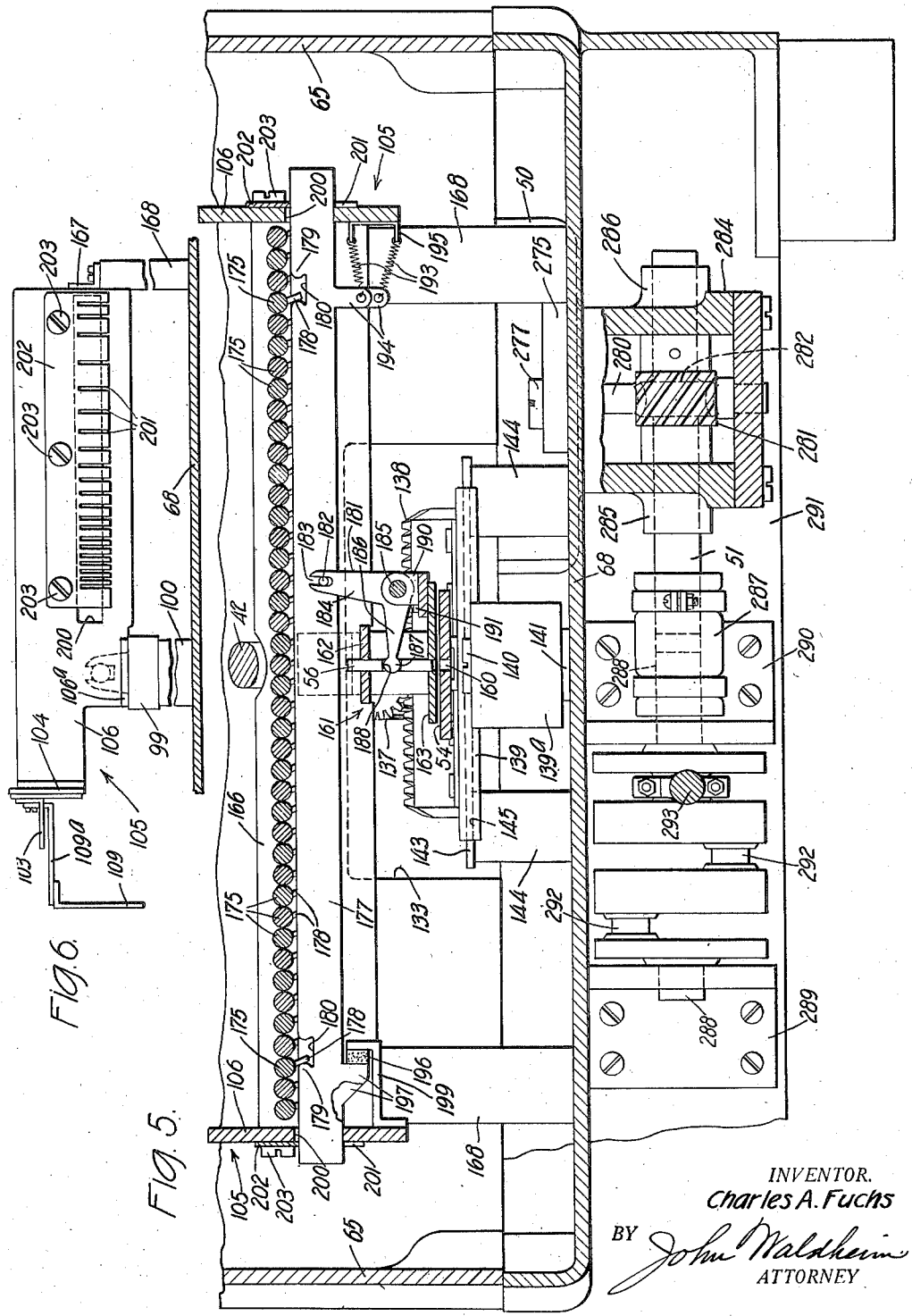
INVENTOR.
Charles A. Fuchs
BY John Waldheim
ATTORNEY

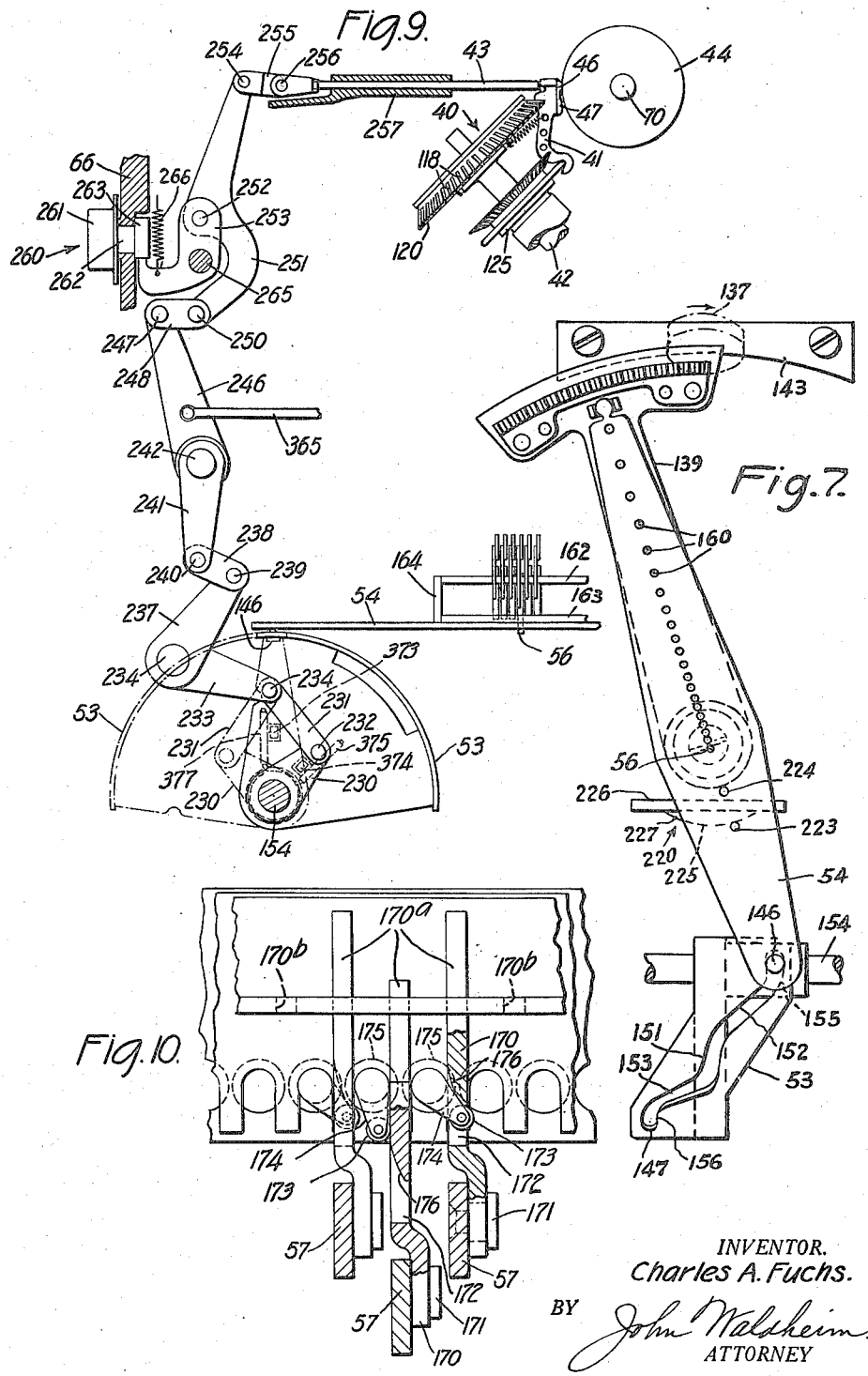

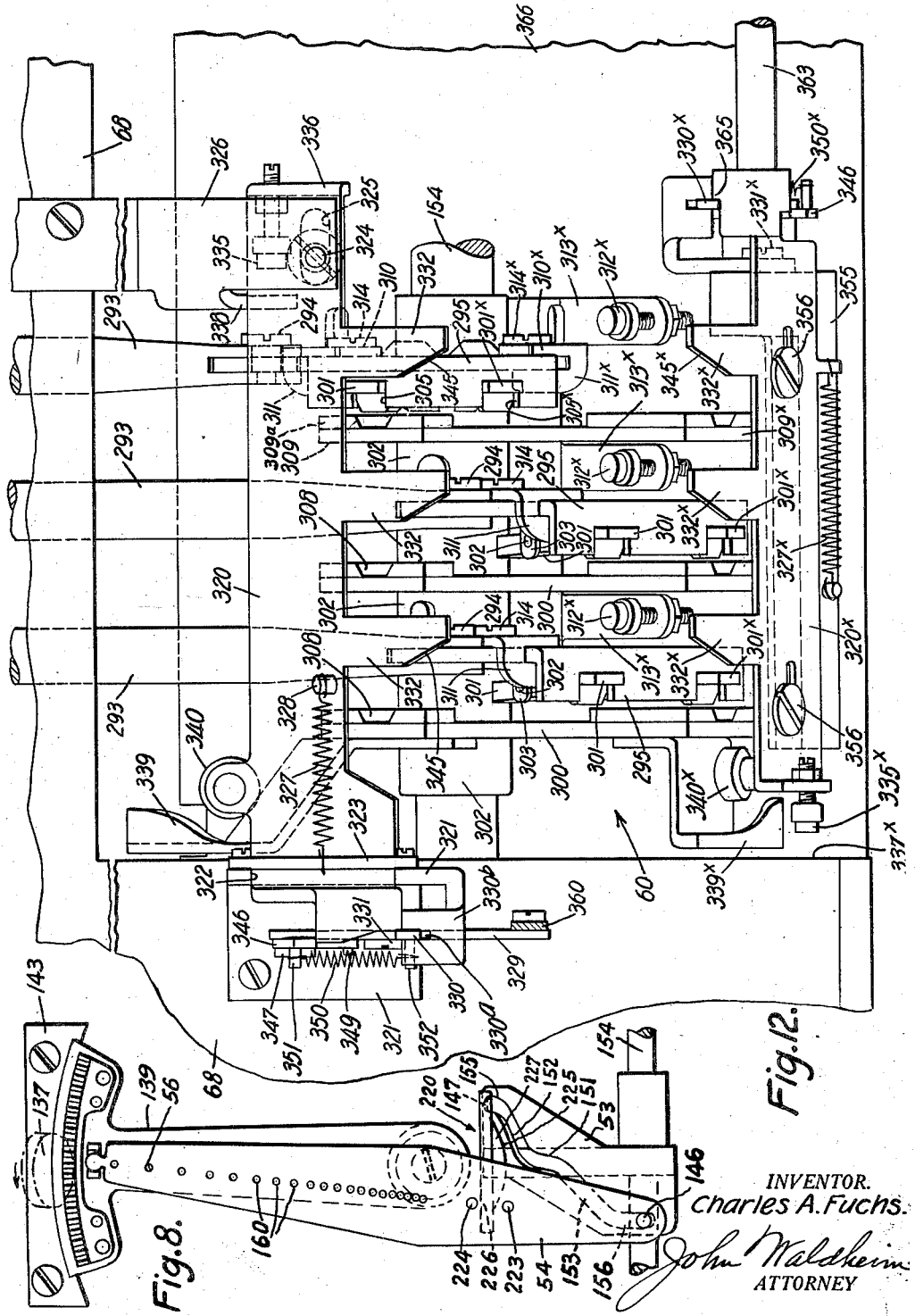

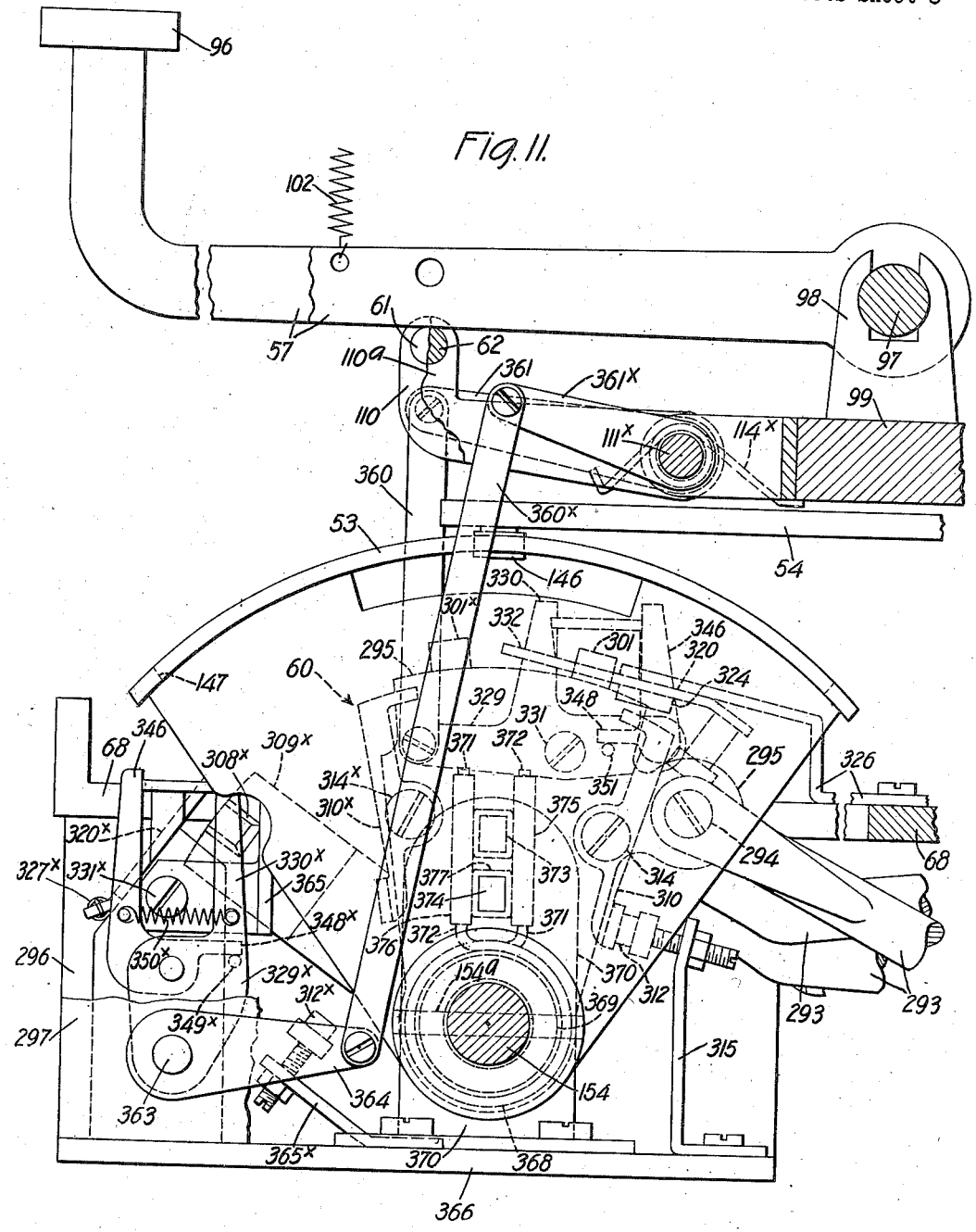

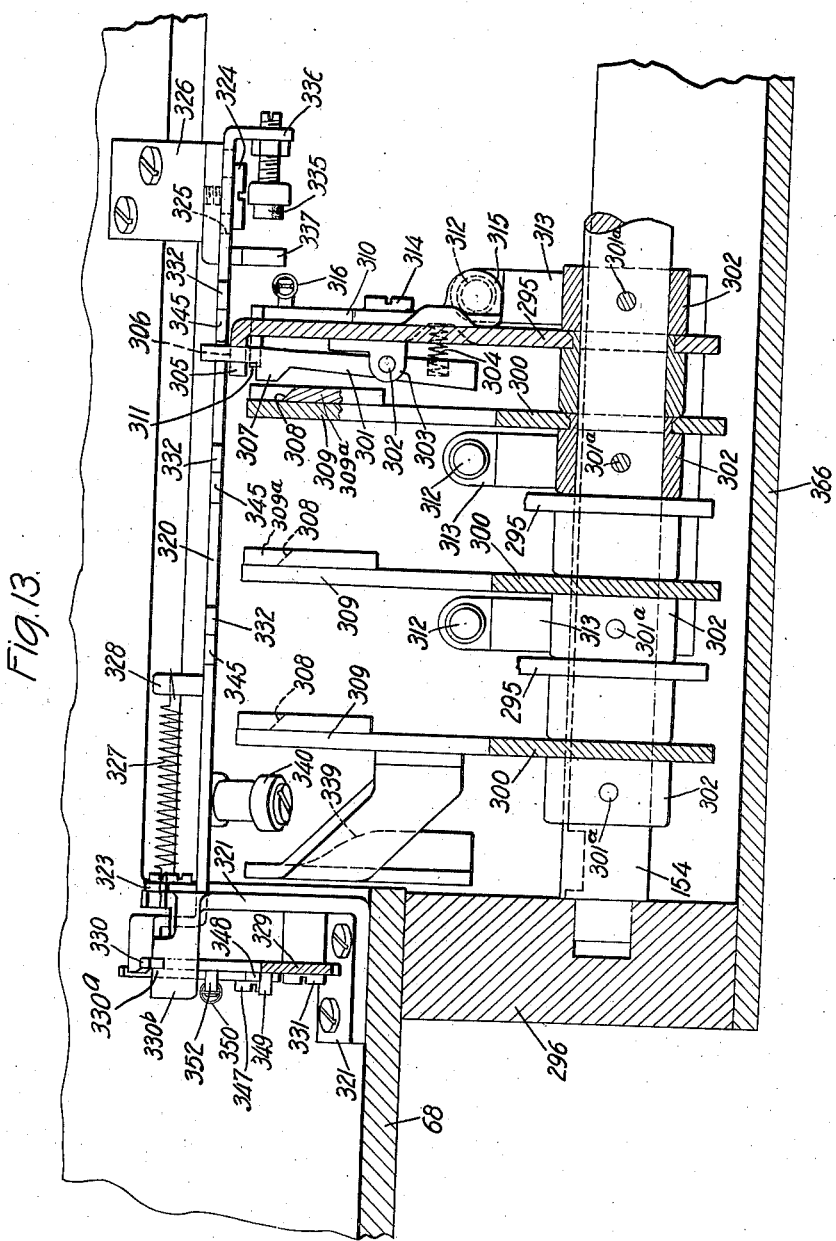

Aug. 23, 1938.　　　　　C. A. FUCHS　　　　　2,127,508
TYPEWRITING MACHINE
Filed Jan. 29, 1935　　　17 Sheets-Sheet 10

INVENTOR.
Charles A. Fuchs.
BY John Waldheim
ATTORNEY

Aug. 23, 1938.    C. A. FUCHS    2,127,508
TYPEWRITING MACHINE
Filed Jan. 29, 1935    17 Sheets-Sheet 11
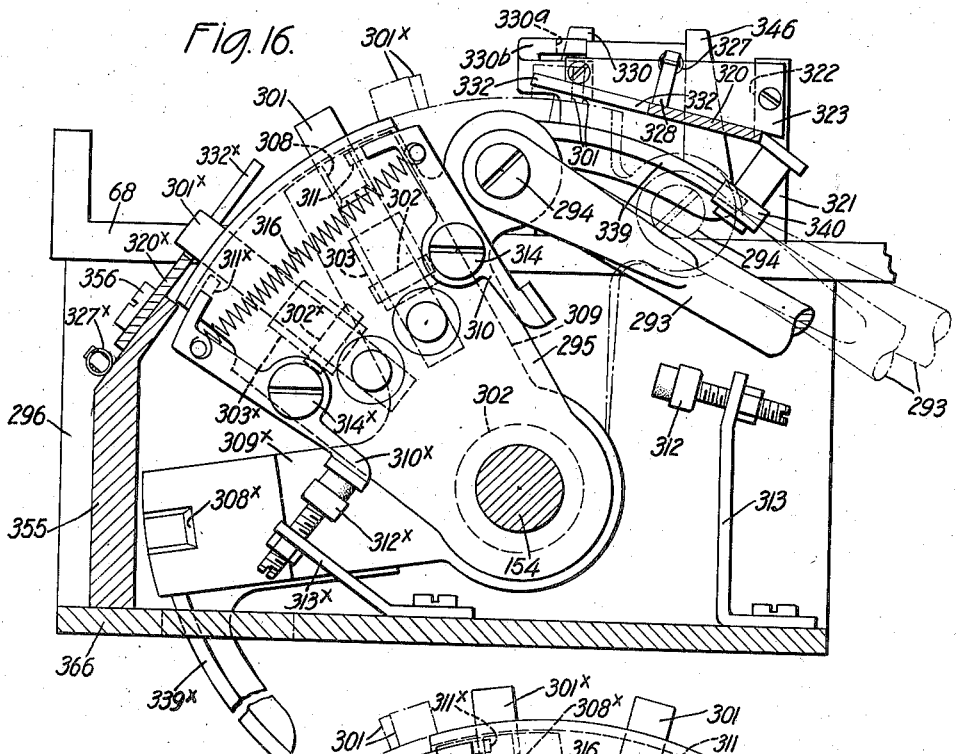
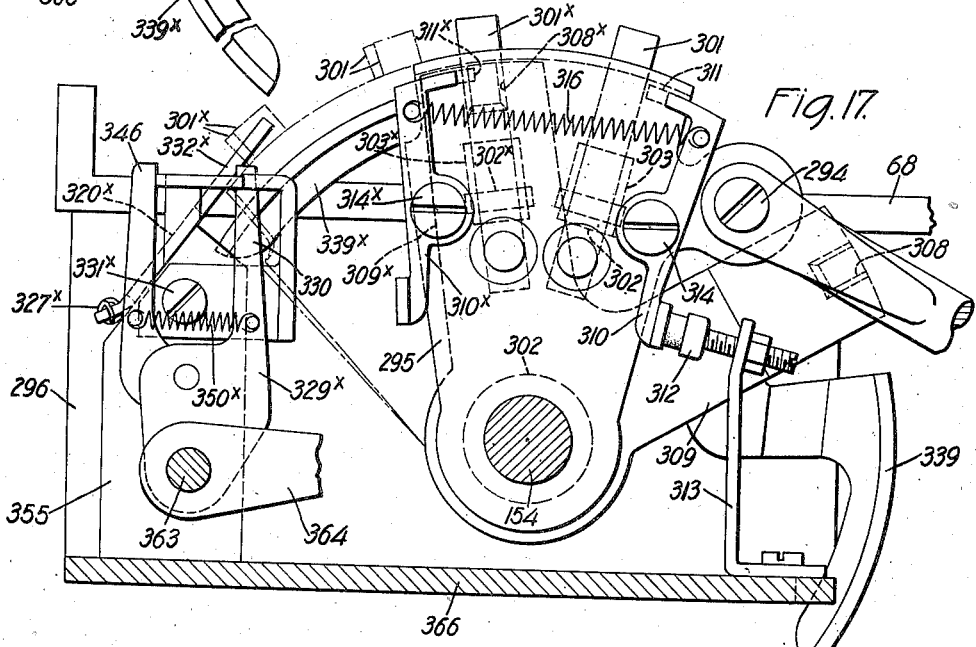
INVENTOR.
Charles A. Fuchs
BY John Waldheim
ATTORNEY Aug. 23, 1938.　　　C. A. FUCHS　　　2,127,508
TYPEWRITING MACHINE
Filed Jan. 29, 1935　　　17 Sheets-Sheet 12
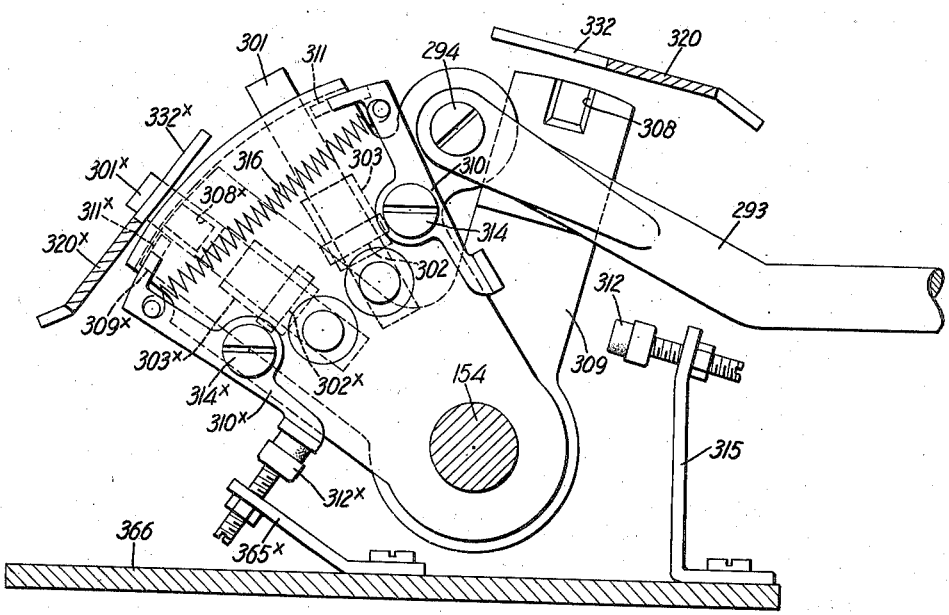
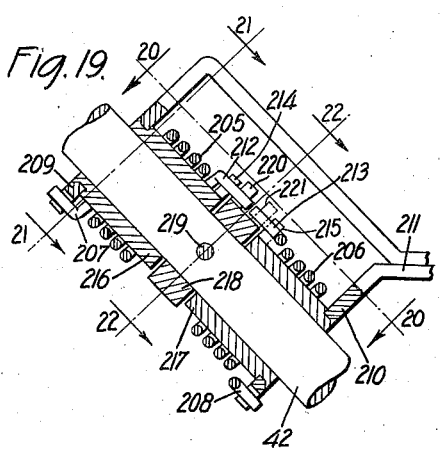
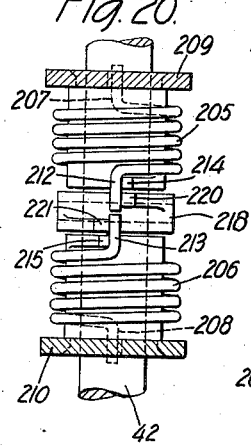
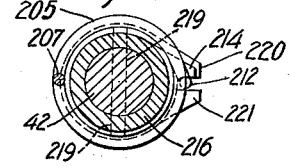
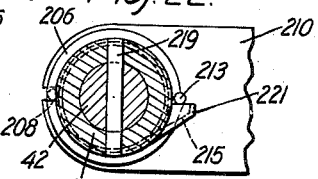
INVENTOR.
Charles A. Fuchs.
BY John Waldheim
ATTORNEY Aug. 23, 1938. C. A. FUCHS 2,127,508
TYPEWRITING MACHINE
Filed Jan. 29, 1935 17 Sheets-Sheet 13
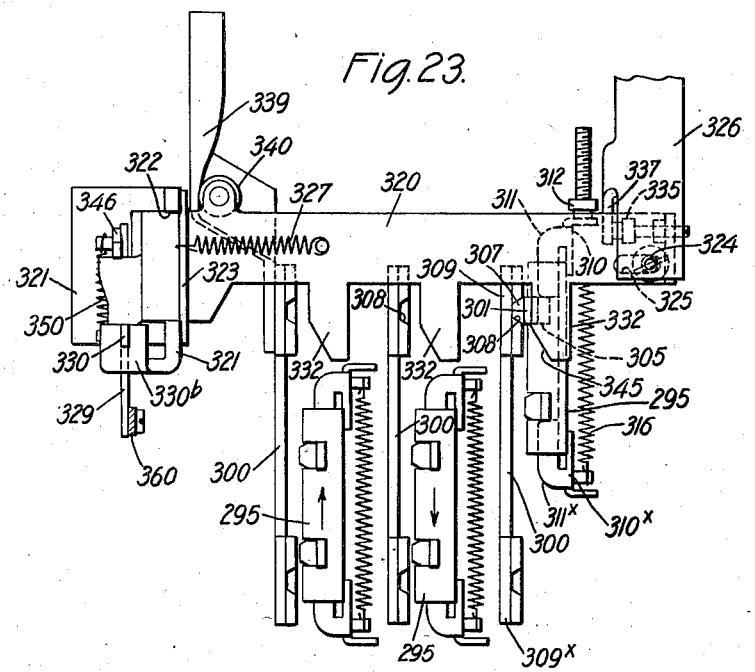
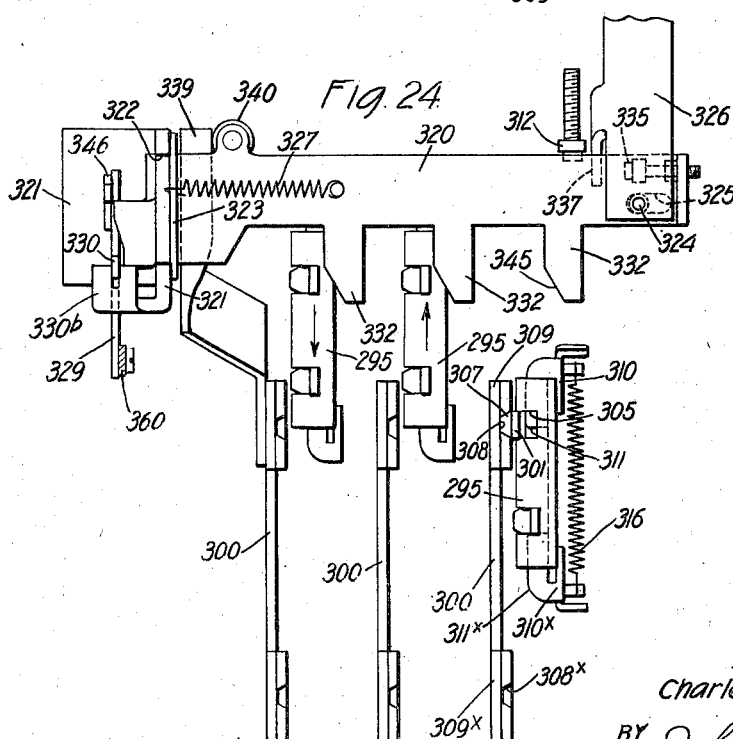
INVENTOR.
Charles A. Fuchs.
BY John Walsheim
ATTORNEY Aug. 23, 1938. C. A. FUCHS 2,127,508
TYPEWRITING MACHINE
Filed Jan. 29, 1935 17 Sheets-Sheet 14
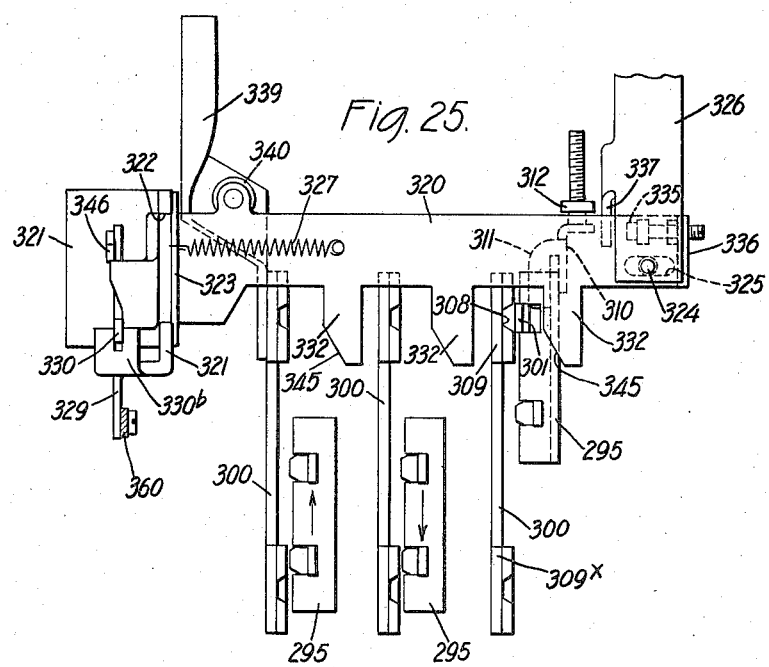
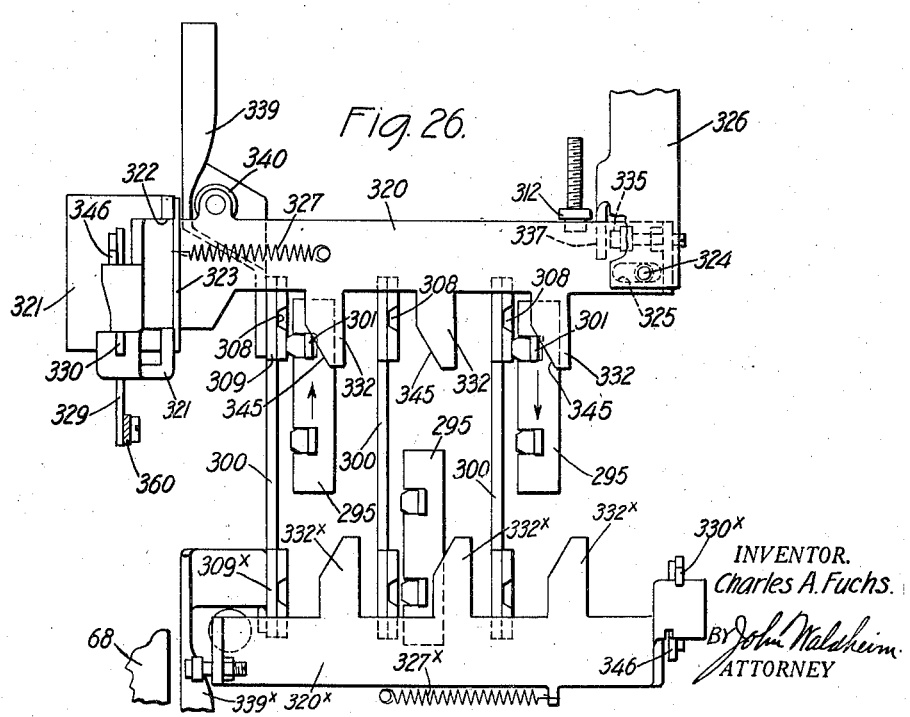
INVENTOR.
Charles A. Fuchs.
BY John Waldheim
ATTORNEY

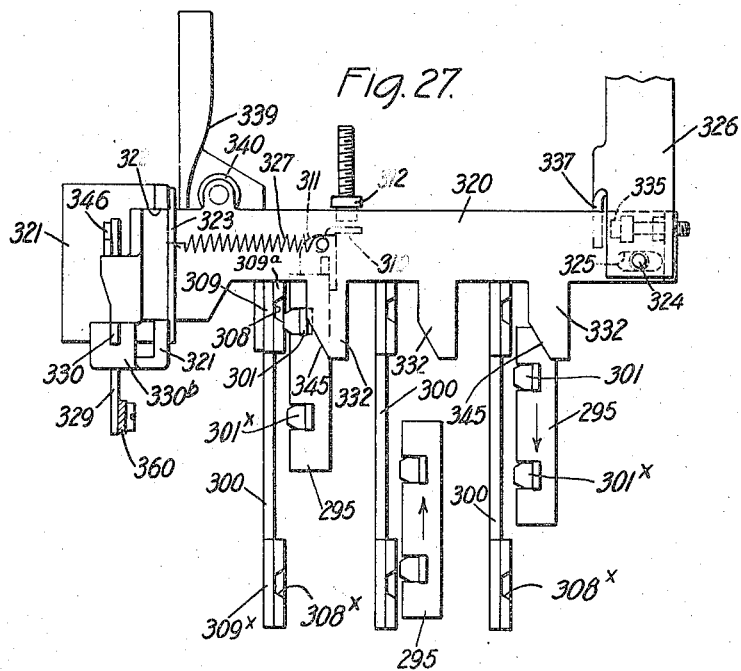
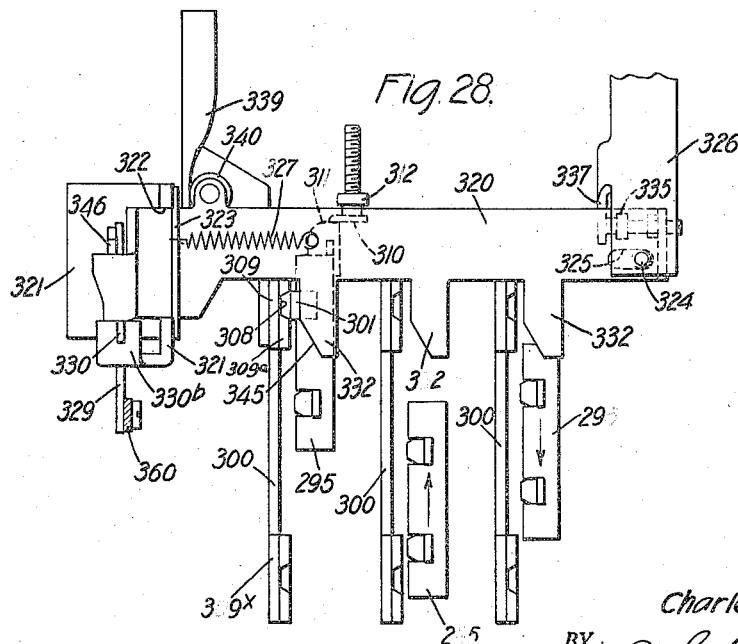

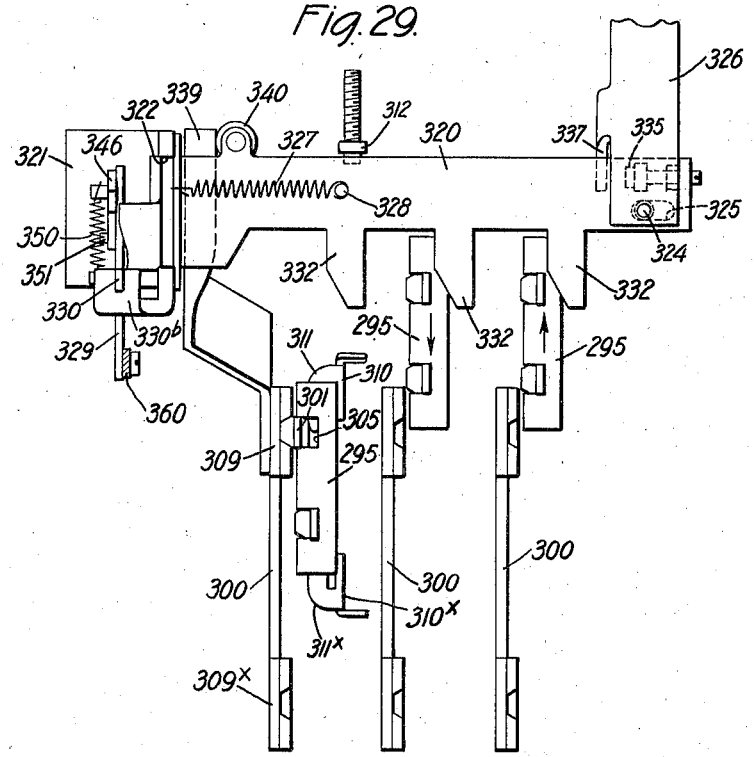
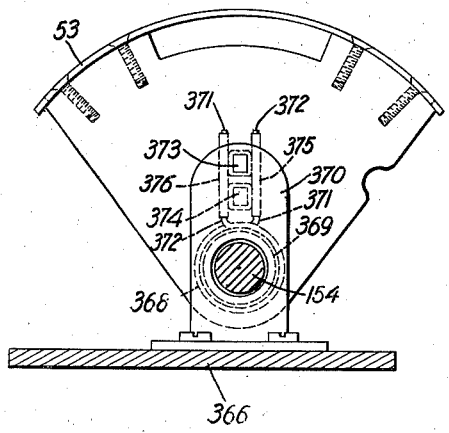
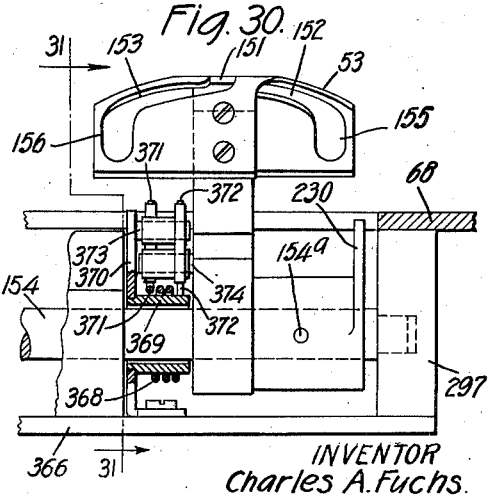

Aug. 23, 1938.   C. A. FUCHS   2,127,508
TYPEWRITING MACHINE
Filed Jan. 29, 1935   17 Sheets-Sheet 17

INVENTOR.
Charles A. Fuchs.
BY John Waldheim
ATTORNEY

Patented Aug. 23, 1938

2,127,508

UNITED STATES PATENT OFFICE 2,127,508

TYPEWRITING MACHINE

Charles A. Fuchs, Hollis, N. Y., assignor, by mesne assignments, to Burnell Laboratory Company, Incorporated, Locust Valley, N. Y., a corporation of Delaware Application January 29, 1935, Serial No. 3,910

116 Claims. (Cl. 197—16)

This invention relates to improvements in typewriting machines, and more particularly to the kind in which the type bars are supported on a carrier which is settable by suitable means including an actuating lever operable in opposite directions from a normal position to juxtapose any one of the type bars at the printing point, and a type bar actuator is then operated to cause the selected type bar to print, the selecting means and the type bar actuator being operable by continually running power means which may be connected, by means of either of two clutches under the control of the key levers, to the type bar setting means to actuate the latter and also effect the actuation of the type bar actuator. Some of the devices, shown herein, are disclosed more fully in my application Serial Number 3,909, filed Jan. 29, 1935 and in which application they are also claimed.

A feature of the invention relates to the utilization of a single clutch to effect the actuation of the type bar setting means in either direction from its normal position. To this end provision is made for connecting the power means differently through the medium of the clutch.

Other novel features relate to means for rendering the clutch effective, means for retaining the clutch connected until it has completed a cycle, and means to render the clutch ineffective at the completion of a cycle.

Another feature of the invention relates to means including a single cam element which cooperates with the actuating lever, of the type bar setting means, to drive it in opposite directions from its normal position.

Another feature of the invention relates to means to bring the actuating lever and the connected type bar carrier to rest with the selected type bar registering with the printing point prior to the printing operation of the type bar. This means includes a cam element which operates the actuating lever connected to the type carrier.

Another feature relates to means to prevent accidental displacement of the cam element and its associated parts from normal position.

Another feature of the invention relates to means whereby the type bar actuator may be operated by the clutch through the medium of the element which operates the actuating lever irrespective of the direction of motion of said element from its normal position.

Another feature relates to novel means to prevent repetition of the printing operation in case the return of a key lever to normal is delayed.

Another feature of the invention relates to novel means for setting suitable fulcrum pins for the lever which actuates the type carrier.

Another feature relates to resilient means which tends to hold the actuating lever in its normal position against accidental pivotal movement to keep the apertures therein in alignment with the fulcrum pins.

Another feature relates to power driven means to actuate the ribbon vibrator.

A further feature relates to means under the control of the case shifting means to prevent the vibration of the ribbon while the case shifting means is in its operated position.

Still another feature relates to power driven means to actuate the carriage feeding means.

Other features and advantages will hereinafter appear.

In the drawings which form part of the specification:

Fig. 1 is a staggered, vertical, sectional side view of the machine;

Fig. 2 is a sectional, top plan view of the machine taken on the line 2—2 of Fig. 1;

Fig. 3 is a top plan view of the machine, the typewriter and the pin setting means being removed therefrom;

Fig. 4 is a sectional, fragmentary, front view taken on the line 4—4 of Fig. 1;

Fig. 5 is a sectional, fragmentary, front view taken on the line 5—5 of Fig. 1;

Fig. 6 is a side view of the frame by which the pin setting bars are guided;

Fig. 7 is a skeleton top plan view showing the type rack actuating lever operated, about one of its fulcrums, and to one side from its normal position;

Fig. 8 is a view similar to Fig. 7 showing the actuating lever operated, about another one of its fulcrums, and to the opposite side of its normal position;

Fig. 9 is a skeleton, side view showing the type bar actuator in its operated position;

Fig. 10 is a detail front view, partly in section, showing the rock shafts, of the pin setting mechanism, and the key lever operated devices associated with them, one of the rock shafts and its corresponding key lever being shown in their operated positions;

Fig. 11 is an enlarged, fragmentary, sectional side view showing the means operable by the key levers for effecting a connection with the power means of the cam which operates the lever whereby the type rack is operated;

Fig. 12 is a top plan view of the clutch;

Fig. 13 is a sectional front view of the clutch taken approximately on the line 13—13 of Fig. 14;

Fig. 16 is a vertical section of the clutch taken on the line 16—16 of Fig. 4 and shows the rock shaft, which carries the lever operating cam, actuated in a counter-clockwise direction from its normal position;

Fig. 17 is a view similar to Fig. 16 showing the rock shaft actuated in a clockwise direction from its normal position;

Fig. 18 is a view similar to Fig. 17 but shows the clutch parts in a position to be coupled prior to the actuation of the rock shaft to the position in Fig. 17;

Fig. 19 is a detail sectional view showing the structure including two springs which tend to hold the drive shaft for the type carrier in its normal position;

Fig. 20 is a sectional view taken on the line 20—20 of Fig. 19;

Fig. 21 is a sectional view taken on the line 21—21 of Fig. 19;

Fig. 22 is a sectional view taken on the line 22—22 of Fig. 19;

Fig. 23 is a developed plan view of the clutch showing some of the parts in the same position as in Figs. 1, 11 and 14 and showing a slide released and operated to effect a connection of one of the reciprocating clutch elements with the corresponding cooperative element;

Fig. 24 is a view similar to Fig. 23 but showing the connected clutch elements in their operated position and the slide restored to normal, the positions of the parts corresponding to those in Fig. 16;

Figure 32:
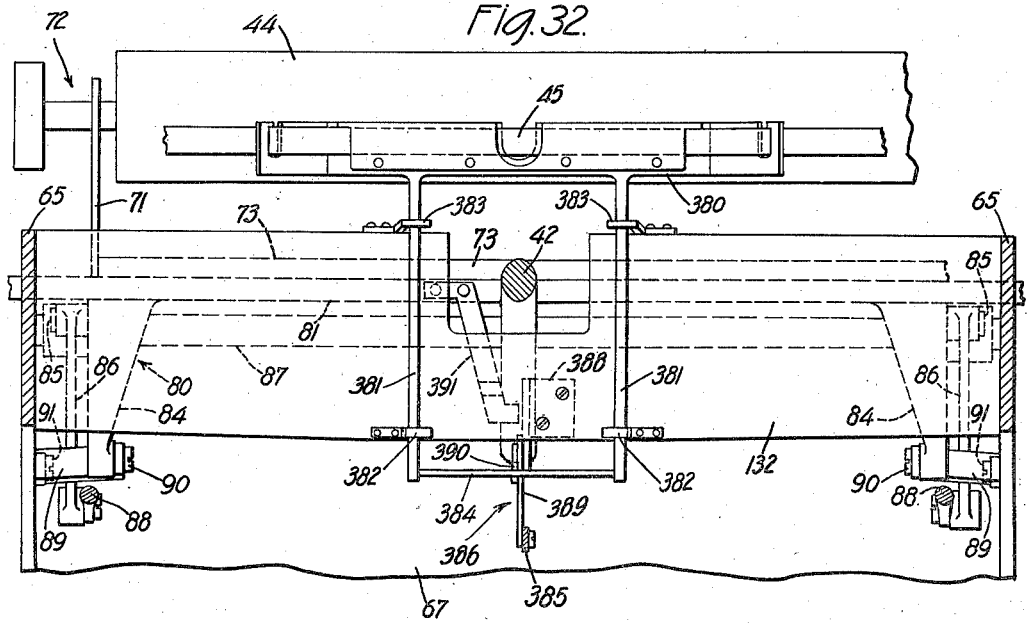
Figure 33:
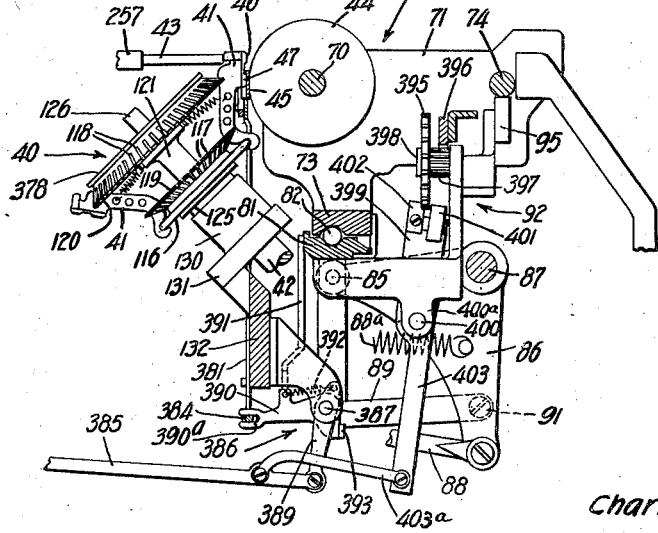

Fig. 25 is a view similar to Fig. 24 showing the position of the connected clutch elements immediately prior to completing a cycle of operation, and the locking pawl just about to be withdrawn from engagement with the connecting device between the two clutch elements, to permit said device to be restored to normal and thus disconnect the reciprocating clutch element from the cooperative clutch element;

Fig. 26 is a view similar to Fig. 23 but shows the slide actuated at an instant when all of the connecting devices are out of alignment with their corresponding slots in the cooperative clutch elements;

Fig. 27 is a view similar to Fig. 26 and shows the pawl actuating slide pushed back slightly by one of the connecting pawls but not far enough to catch behind the releasing pawl at the left hand end of the slide;

Fig. 28 is a view similar to Fig. 27 and shows the connecting pawl after it has been registered with its corresponding slot and moved into said slot by the slide;

Fig. 29 is a view similar to Fig. 28 and shows the clutch operated through half a cycle, the connected reciprocating clutch element being in a position extremely opposite to that shown in Fig. 28;

Fig. 30 is a fragmentary, front view, partly in section, showing the cam which actuates the type carrier actuating lever and the spring devices for holding said cam in its normal position;

Fig. 31 is a vertical section taken on the line 31—31 of Fig. 30;

Fig. 32 is a fragmentary, front view in section taken on the line 32—32 of Fig. 1 and shows the ribbon vibrating mechanism and the means under the control of the case shift mechanism which prevents the vibration of the ribbon under certain conditions; and Fig. 33 is a fragmentary, sectional, side view showing the platen shifted down to its upper case position, the ribbon vibrating means locked against actuation, and the escapement being actuated by the power means.

Similar reference characters represent similar parts throughout the drawings.

General description

A brief description will be given followed by a more detailed one of the construction and operation of the machine which includes a type unit 40, Fig. 1, having two groups of short or midget type bars 41 arranged in two sets at opposite sides of the printing point. The type unit 40 is attached to a shaft 42 which may be rotated in opposite directions from a normal position to accordingly rotate the type carrier and thus locate any one of the type bars of either group at the printing point. A type bar actuator 43, which is substantially in alignment with the printing point, is also operable to actuate the selected type bar against a platen 44 to print through a ribbon 45 and against a work sheet, not shown, on said platen, each type bar being provided with a lower case type 46 and an upper case type 47.

A continually running power means includes a motor 50, at the rear of the machine, which drives a shaft 51 to which is connected a driving device 52, Figs. 1 and 2. Said driving device may be connected to operate a cam element 53 in either one of two directions from a normal position. The cam element engages the forward end of a fulcrum bar or lever 54 connected to rotate the shaft 42, the fulcrum bar 54 receiving always the same extent of motion from the cam element 53, irrespective of the direction of movement of the latter. The lever 54 is operable about any one of a set of fulcrum pins 56 which are selectively settable into cooperation therewith, in a manner hereinafter described, by the depression of any one of the key levers 57.

The key levers 57 are also divided into two groups, a group A including all of the key levers to the left of the middle of the machine and a group B including all of the key levers to the right of the middle of the machine, said key levers representing characters corresponding to those of the types on the two groups of type bars 41.

A single clutch 60, Figs. 1, 3, 4, 11 and 12, is utilized, in the present invention, to render effective the power means to drive the type carrier in one direction or the other, from its normal position, to register the selected type bar at the printing point. Two universal bars 61 and 62, Figs. 1, 2 and 4, are provided, the bar 61 being operable by the key levers 57 of the group A and the bar 62 being operable by the other set B of key levers. These universal bars are operable by any one of the associated group of key levers to actuate suitable mechanism, hereinafter described, to actuate the clutch differently to connect the power means variously with the cam 53 which actuates the fulcrum bar, and thus actuate the latter in one direction or the other from its normal position to accordingly set the type carrier 40. After each printing operation the clutch is automatically rendered ineffective to disconnect the type carrier actuating means, including the fulcrum bar 54, from the continually running power means.

A more detailed description of the construction and operation of the machine will now be given.

Frame

The machine includes a main frame having two side plates 65, a front plate 66, a rear plate 67 and a base plate 68, the latter being suitably secured to the side plates 65.

Carriage

The platen 44 is supported by a shaft 70 mounted to rotate in end plates 71 of a carriage 72, said end plates 71 being connected to each other by guide bars 73 and 74. The work sheet, not shown, may be inserted around the platen from the rear thereof over a paper table 75 having an apron 76 to guide the work sheet to the printing line at the front of the platen. Feed rollers 77 and 78 may be supported on the carriage in any well known manner to assist in feeding the work sheet around the platen.

Platen shifting means

A platen shift frame 80, Figs. 1, 32 and 33, includes a rail 81 upon which the carriage 72 is supported, to travel back and forth transversely of the machine, through the medium of anti-friction balls or rollers 82 under the bar 73 of the carriage, said carriage being urged in a letter space direction by suitable propelling means, not shown. Arms 84 extend downwardly from the rail 81, one at each end thereof, and each is pivotally connected, at 85, to a bell crank 86, both bell cranks 86 being secured to a rock shaft 87, supported in the side plates 65 of the main frame. The bell cranks 86 and the rock shaft 81 form a frame which may be actuated, by means of key actuated links 88, to shift the platen down for printing with the upper case types 47. A return spring 88ª connected to one of the bell cranks 86 returns the platen to its lower case position. Guide links 89 are connected at their forward ends by pivot studs 90 to the lower ends of the arms 84, the rear ends of the guide links 89 being pivoted on the side plates 65 of the main frame by studs 91.

Secured to the rail 81, near the middle thereof, Fig. 1, is a bracket 92 including two rearwardly extending arms 93 joined by a cross bar 94, the latter having rotatably supported thereon a roller 95 engaged by the bar 74 to assist in guiding the carriage and also assist in shifting the platen.

Key levers

There are forty-two key levers 51, Figs. 1, 2 and 4, one for each type bar 41. These key levers are provided at their forward ends with character keys 96 arranged in four banks in the key board. All of the key levers are supported at their rear ends by a fulcrum rod 97, supported in a wide, upward extension 98 of a bar 99 positioned transversely of the machine and secured at each end to a post 100 by a screw 101, the posts 100 projecting upwardly from the bottom plate 68. Each key lever is operable against the action of a return spring 102, connected at its lower end to the key lever, the upper end of each spring 102 being connected to an angle plate 103 supported on a front plate 104 of a frame 105, the latter including also two side plates 106 secured to the cross bar 99, said frame being supported at its forward end upon the bar 99 by feet 106ª. The key levers are guided in slots 107, of the bar 99, and in slots 108 of a comb plate 109 mounted on the plate 104 by brackets 109ª.

As previously stated the key levers are arranged in two groups A and B one for each of the groups of type bars, the key levers of the groups A and B being effective to actuate the universal bars 61 and 62 respectively. The universal bar 61 is supported on two arms 110, Figs. 2 and 4, which are secured to a rock shaft 111, the latter being supported in ears 112 of a bracket 113 secured to the bar 99. A spring 114 is coiled around the shaft 111, at the lefthand end thereof, to return the universal bar 61 to normal. The universal bar 62 is supported in a similar manner by arms 110ˣ secured to a rock shaft 111ˣ which is supported in ears 112ˣ of a bracket 113ˣ secured to the bar 99, a return spring 114ˣ being provided for said universal bar. The mechanism operable by the universal bars 61 and 62 to connect the power means with the type bar carrier 40 will be described later.

Type carrier

The type carrier 40 is like that shown in my above mentioned copending application, and includes a circular fulcrum plate 116 upon the outer edge of which the type bars 41 are pivoted. The type bars are guided in radial slots 117 and 118 of circular guide plates 119 and 120 respectively secured to a body part 121, and each type bar is operable against the action of a return spring 122.

In the present form of the invention the type bar carrier 40 is demountably attached to a reduced portion 123 of the drive shaft 42, the body part 121 having an aperture 124 into which the shaft portion 123 extends. A latch, not shown, holds the type bar carrier against a coupling element 125 secured to the shaft 42, which element forms a driving connection between the shaft 86 and the type carrier. The latch may be actuated by a push button 126 to render it ineffective and thus permit its removal from the drive shaft.

Actuating mechanism for type bar carrier

The mechanism for actuating the type bar carrier 40 includes the drive shaft 42, Fig. 1, the upper end of which is rotatably supported in a boss 130 on the bracket 131 secured to a cross bar 132 supported at its end by the side plates 65 of the machine frame. The lower end of the shaft 42 extends through a slot 133 of the rear plate 67 and is guided by a ball bearing 134 of a bracket 135 secured to the rear plate 67 by one or more bolts 136.

To the lower end of the drive shaft 42 is secured a pinion 137 engaged by a gear sector or rack 138, Figs. 1 and 3, having an arm 139 provided with a hub 139ª by which it is pivotally supported to swing about a stud 140, secured to the base plate 68, to rotate the shaft 42 through the medium of the rack 138 and pinion 137, said arm bearing on a flange 141 of said stud and being held on said stud by a screw 142. The rear end of the arm 139 is supported and guided by a tongue like plate 143, Figs. 1 and 2, rigidly mounted on posts 144 of the base plate 68 and engaging in a slot 145 extending from side to side in the rear edge of the arm 139. The rack carrying arm 139 is actuatable by the fulcrum bar or lever 54 in a manner now to be described.

The forward end of the fulcrum bar or lever 54 is connected with the cam element 53 by a follower roller 146, Figs. 1, 3 and 11, engaging in a cam slot 147 of the cam element 53, and the rear end of the lever 54 is connected to the rack carrying arm 139 by a projection 148, thereon, engaging in a slot 149 formed in a block 150 secured to the rack carrying arm 139.

In the normal or home position of the lever the roller 146 engages in a dwell 151 of the cam slot 147 to assist in holding the actuating lever against accidental lateral displacement. The slot 147 also has a cam portion 152 and a cam portion 153 so that when the cam element 53 is moved about the axis of its supporting rock shaft 154 in a counter-clockwise direction, from its normal position, Fig. 1, the cam portion 152 swings the lever 54 in a counter-clockwise direction, Fig. 7, about the set of fulcrum pins 56 and thereby swings the rack carrying arm about its pivot stud 140 in the same direction and thus rotates the pinion 137 to set the type carrier with the selected type bar at the printing point. When the cam element 53, which is secured to the rock shaft 154 by a pin 154ᵃ, is actuated in a direction opposite to that in Fig. 7 the lever 54 is swung thereby, through the medium of the cam portion 149 in a clockwise direction to rotate the pinion 137 and the type carrier in a counter-clockwise direction, Fig. 8.

It will be understood that the extent of movement of the actuating lever 54, at its forward end, is always the same and that since the lever 54 may be actuated about any one of the fulcrum pins 56, depending upon which one is set, the extent of motion at the rear end of said lever varies accordingly. It will further be understood that these various extents of movement of the rear end of the lever 54, are imparted to the rack carrying arm 139 to rotate the type carrier 40 through angular distances corresponding with the angular positions of the various type bars arranged about the axis of the type carrier to juxtapose any one of the type bars at the printing point.

By an inspection of Fig. 3 it will be seen that the cam portions 152 and 153 of the slot 147 are curved at their inner ends to gradually meet the dwell 151, and that the outer ends of the cam slot portions 152 and 153 are also curved to gradually meet dwells 155 and 156 respectively. With this arrangement the cam element 53, when actuated in either direction from its normal position, imparts to the actuating lever 54 harmonic motion to gradually start the rotation of the type wheel from its normal position and to gradually bring it to rest in its operated position with the selected type bar at the printing point.

After the follower 146 has reached the dwell 155 or the dwell 156 and the rotation of the type carrier has been thus arrested the movement of the cam 53 continues while certain mechanism connected therewith and hereinafter described, operates the actuator 43 to cause the selected type bar to print while the type bar carrier 40 is at rest.

*Fulcrum pins for type carrier actuating lever*

The fulcrum pins 56 are normally ineffective and may be set individually to engage in holes 160, Figs. 1, 3, 5, 7 and 8, of the actuating lever 65, the lower end of each pin 56 and the upper end of each hole being shaped to enable the pins to enter the corresponding holes readily. Said pins 56 are guided in a frame 161, Figs. 1, 2 and 5, including an upper plate 162 and a lower plate 163, said plates being secured to each other at their forward ends by a plate 164 and at their rear ends by a plate 165, the latter being secured to a plate 166 extending transversely of the machine and supported by brackets 167 secured to the top of posts 168 on the base plate 68, the plate 166 forming part of the frame 105. The pins 66 are settable, in a manner hereinafter described, into cooperative relation with the actuating lever 54.

It will be understood, although there are shown forty-two type bars and the same number of key levers, there are only half as many, (twenty-one) fulcrum pins 56, each fulcrum pin representing two key levers and the two corresponding type bars.

*Fulcrum pin setting means*

In the present invention the fulcrum pins 56 are settable to their effective positions by the depression of the key levers 57. To this end each key lever has pivotally connected thereto a link 170, Figs. 1, 2, 4 and 10, by a headed stud 171 so that the link may be pulled downwardly by the depression of its key lever. Each link 170 has a slot 172 into which extends a follower 173 of a crank arm 174 on the forward end of a rock shaft 175. As the link descends, a cam 176 at the upper end of the slot 172 acts on the follower 173 to rock the shaft 175 in a clockwise direction, as in Fig. 10, to actuate a horizontal slide 177, leftwardly, Fig. 5, through the medium of a tongue 178 on said rock shaft and engaging a shoulder 179 at one side of a slot 180 in the upper edge of the slide 177.

To keep the links 170 in place and also prevent lateral movement of each one as it acts on the follower 173, its upper end is guided by a stem 170ᵃ engaging in an aperture 170ᵇ, Figs. 2 and 10, the lower end of each link being guided by the key lever which, it will be remembered, is guided by the slot 108 of the comb plate 109 and the slot 107 of the bar 99.

Each slide has connected thereto a bell-crank 181, Figs. 2 and 5, by a pin 182 on the slide 177 extending into a slot 183 in one end of an arm 184 of the bell-crank. Thus while the slide 177 is being actuated the connected bell-crank 181 is moved in a counter-clockwise direction, Fig. 5, about a fulcrum rod 185, to depress one of the fulcrum pins 56 through the medium of an arm 186 of the bell-crank 184, the free end 187 of the arm 186 engaging in a slot 188 formed in the fulcrum pin 56. After the fulcrum pin has been thus set so that its lower end engages in the corresponding aperture of the actuating lever 54 the latter may be swung about the set fulcrum pin to actuate it in either direction from its normal position, Fig. 3, to rotate the type carrier for the purpose of positioning the selected type bar in alignment with the printing point. The plunger 42 is then actuated to cause the selected type bar to print against the work sheet around the platen.

It will be understood that each pin setting slide 177 has two slots 180 so that it may be actuated by either one of two rock shafts 175, to set the same fulcrum pin and thus determine the extent of motion to be imparted by the actuating lever 163 to the type carrier. It will also be understood that half of the number of rock shafts 175 are associated with the group A of key levers and that the other half of the number of rock shafts 175 are associated with the group B of key levers. It will further be understood that the direction of movement of the actuating lever 163 from its normal position is controlled, as hereinafter described, by means operable by the universal bars 61 and 62 which are operable by the group A and group B of key levers respectively.

The bell-cranks 181 are all supported on the rod 185 which extends through a bar 190, Figs. 2 and 5, secured to the lower plate 163 of the pin guiding frame 161 by screws 191, the bell-cranks being guided in slots 192 in the bar 190. Each bell-crank 184 is returned to normal, after the printing operation, to withdraw the fulcrum pin 56, by a spring 193, Fig. 5, connected at one end to a projection 194 of the slide 177, all of the springs being connected at their other ends to a channel bar 195 secured to the side plate 106 at the right side of the frame 105. The slides 177 are arrested in their normal position by a stop pad 196 of any suitable sound deadening material such as leather or fiber, said stop being engaged by lugs 197 extending downwardly from the slides 177, said stop being supported by a bracket plate 199 secured to the right side plate 106 of frame 105.

*Supporting and guiding of pin setting slides*

As previously stated the rock shafts 175 extend fore-and-aft of the machine and they are supported in the plates 104 and 166 of the frame 106. The slides 177 of which there are twenty-one, one for each fulcrum pin 56, are arranged transversely of the rock shafts 175 so that each slide may readily be actuated by its rock shafts. All of the slides 177 extend through two apertures 200, Figs. 5 and 6, one in each of the side plates 106 of the frame 105 and they are guided in individual slots 201 of guide plates 202 at said apertures and secured to the side plates 106 by screws 203. It will be seen by an inspection of Figs. 5 and 6 that the slide bars 177 rest upon the bottom edges of the slots 200 of the side plates 106 and that they are held against said edges by the guide plates 202.

*Arrangement of pin setting bell-cranks for fulcrum pins*

The pin setting bell-cranks 182 are arranged in a single group, at one side of the series of pins 56. They are all straight as seen from the top, Fig. 2, except the two rearmost ones. These two bell-cranks have their arms 186 bent so as to extend rearwardly, from the arms 184, to their pins 56. The reason for so bending the arms 186 is that the slides 177, which are connected to the arms 184 of these two rearmost bell-cranks, may occupy a position sufficiently forward of the machine to provide clearance for the drive shaft 42.

*Relative arrangement of types on carrier and tongues on actuating rock shafts with respect to the arrangement of character keys in key board*

To permit types which are used most frequently to be located in positions on the type carrier close to the printing point, irrespective of the positions of the corresponding keys 96 in the key board, and at opposite sides of the printing point, so as to reduce the work required to position these types to a minimum and thus expedite the operation of the machine, the slots 180 in which the tongues of the rock shafts 175 engage may be arranged in the order illustrated in Fig. 2 where the tongues corresponding to the letters E and I cooperate with the selecting bar 200 associated with the rearmost fulcrum pin 56 by which pin the smallest movements of the fulcrum bar are effected. Thus the type bars representing the characters E and I may be located at the middle of the entire set of types, or in other words, at the inner ends of the two groups on the type carrier while their respective keys in the key board may be located in their regular positions near one end of the standard typewriter key board. It will be understood that the same order of arrangement of connections of the other rock shafts to their slides is followed.

*Means to insure registration of fulcrum apertures of actuating lever with fulcrum pins*

As previously stated the forward end of the actuating lever 54 is held against accidental displacement laterally of the machine by the dwell 151 of the cam slot 147. Thus the cam element 53 assists in holding the actuating lever 54 in its normal position to keep the apertures 160 of said lever in register with the fulcrum pins 56. To further assist in keeping the apertures in register with their corresponding fulcrum pins there are provided two springs 205 and 206, Fig. 1 and Figs. 19 to 22. The respective ends 207 and 208 of the springs 205 and 206 are anchored in ears 209 and 210 of a bracket 211 secured to the rear plate 67, of the main frame, by the bolt 136, Fig. 1, which also secures the shaft supporting bracket 135, the respective free ends 212 and 213, of the springs 205 and 206, engaging stops 214 and 215 on sleeves 216 and 217 respectively, said sleeves being secured to the ears 209 and 210. The type carrier actuating shaft 42 extends through the sleeves 216, 217 and has secured thereto a collar 218 by a pin 219. The collar is located between the ends of the sleeves 216 and 217 and is provided with two lugs 220 and 221 adapted to cooperate respectively with the free ends 212 and 213 of the springs 205 and 206.

The free ends 212 and 213 of the springs 205 and 206 act in opposite directions in Fig. 20 and tend to rotate the shaft 42 in opposite directions this being prevented however by the stops 214 and 215 with which the free ends of the springs also engage. Consequently if the type carrier is rotated in either direction the free end of one of the springs is caused by the lug on the collar 218, to leave its stop to increase the action of the spring while the other spring remains undisturbed. The operated spring assists in rotating the shaft 42 back to normal. From the foregoing it will be understood that the springs tend to hold the shaft in its normal position with respect to rotation, and since the shaft 42 is connected to the pinion 137 and rack supporting lever 139 with the rear end of the actuating lever 54 the springs 205 and 206 assist in holding the lever 54 in its normal position with the apertures 160 therein in register with their respective fulcrum pins 56.

It is also advantageous to guard against longitudinal displacement of the actuating lever 54, while in its normal position, so as to keep the apertures 160 in register with their corresponding indexing pins 56. To this end there is provided a retaining device 220, Figs. 1, 3, 7 and 8, which includes two pins 223 and 224 engaging the front edge 225 and the rear edge 226 respectively, of a lip 227, as in Fig. 3, the lip 227 being formed at the top of a fixed bracket 228 on the base plate 68. It will be seen, by an inspection of Fig. 2, that lip 227 occupies all of the space between the pins 223 and 224 thus holding the actuating lever 54 against longitudinal displacement while in its normal position. The front edge 225 of the lip is curved sufficiently to provide clearance for the pin 223 during the operation of the lever 54. It will be understood that pins 223 and 224 may leave the edges 225 and 226, as in Fig. 8, during the operation of the lever 54 since it is held against longitudinal displacement by the active fulcrum pin 56 about which it is swinging.

Operating linkage for type bar actuator

The type bar actuator 42 is operated by mechanism, now to be described, which includes an upwardly extending arm 230, near the middle of the machine, Figs. 1, 3 and 4, secured to the shaft 154. A link 231 is pivotally connected by a headed stud 232 to form with the arm 230 a toggle which, when the rock shaft is actuated in a clockwise direction, Fig. 9, in order to operate the actuating lever 54 as in Fig. 8 by the cam element 53, causes the link 231 to pull downwardly on an arm 233 through the medium of a pivot stud 234. The arm 233 is secured to a shaft 234 being supported in brackets 235 and 236, one at each end thereof, secured to the base plate 68.

The shaft 234 is located beneath the key levers and extends from a position near the middle of the machine to the righthand side thereof, Fig. 4. At its righthand end the shaft 234 has secured thereto an arm 237, said arm extending upwardly therefrom outside the set of key levers and being pivotally connected to a link 238 by a stud 239, to pull the link rearwardly. The link 238 is pivotally connected by a stud 240 to the free end of a downwardly extending arm 241 secured to a shaft 242 to rock the latter in a counter-clockwise direction, Figs. 1 and 9, said shaft 242 being supported in lugs 243, 244 and 245 extending rearwardly from the front plate 66. The shaft 242 is located above the key levers and has secured thereto, near the middle of the machine, an upwardly extending arm 246 the upper end of which is pivotally connected by a stud 247 to a link 248 to pull said link forwardly.

The rear end of the link 248 is connected by a pivot stud 250 to the lower end of a lever 251 to swing said lever in a clockwise direction about a fulcrum 252 on a bracket 253. The upper end of the lever 251 has pivotally connected thereto, at 254, a link 255 which is also pivotally connected at 256 to an adjustable block on the forward end of the type bar actuator or rod 43, said rod being guided in a bracket 257. Thus it will be understood that when the lever 251 is actuated in a clockwise direction the printing rod 43 is pushed rearwardly to press the selected type bar against the platen to print. Upon the return of the rock shaft 154 to its normal position from the position in Fig. 9 the parts comprising the mechanism connecting the rock shaft 154 with the type bar actuator 43 move in the opposite direction to those above mentioned to thus restore the type bar actuator to normal. A brace 259 is secured to the rear plate 67 at the middle of the machine and extends upwardly behind the rod 74 to brace the carriage against the action of the actuator 43 during a printing operation.

When the rock shaft 154 is actuated in a counter-clockwise direction in Fig. 9 from its normal position to operate the actuating lever 54, as in Fig. 7, by the cam element 53, the toggle elements 230 and 231 move from the position in Fig. 1 to the positions indicated by dot-and-dash lines in Fig. 9. In other words these elements 230 and 231 move in directions opposite to those in which they move, as above described, when the rock shaft 154 is actuated in a counter-clockwise direction. It will be understood that irrespective of the direction of movement of the rock shaft 154, whether clockwise or counter-clockwise, from its normal position Fig. 1, the toggle comprising the elements 230 and 231 always pulls down on the arm 233 to operate the type bar actuator 43, as above described, to cause the juxtaposed type bar to print against the platen.

Adjustment of type bar actuator in accordance with the thickness of the pack of work sheets To compensate for different thicknesses of work sheets or pack of work sheets, which may be introduced around the platen, provision is made of micrometer adjusting means 260 to change the position at which the active end of the type bar actuator comes to rest with respect to its distance from the face of the platen. This adjusting means 260 may be like that disclosed in my above mentioned application and includes a fingerpiece 261 secured to a shaft 262 supported in the front plate 66 and extending therethrough. The inner end of the shaft 262 has thereon an eccentric or cam 263 which is rotatable by the fingerpiece 261 and engages an arm 264 of the bracket 253 to control the actuation of the latter in either direction, about the axis of a supporting shaft 265, supported in the upper ends of brackets 244 and 245, to thus carry the fulcrum 252 forward or rearward of the machine. A spring 266 tends to hold the arm 264 against the eccentric 263. It will be understood that as the fulcrum 252 is thus moved it swings the lever 251 about the stud 250 thus causing the upper end of the lever to move either forwardly or rearwardly, depending on the adjustment of the eccentric, and thus set the type bar actuator so that its active end is farther from or closer to the platen. Thus, since the distance through which the type bar actuator is operated is constant and its normal position may be varied, as above described, it is caused to move to various positions with respect to the face of the platen in accordance with the thickness of the work around the platen. The spring 266 also yields to the action of the power means in case the operator forgets to set the adjusting means when a thicker pack of work sheets is to be typed. This yielding action of the spring 266 prevents injury to the actuator 43 and associated parts if operated under such conditions.

Movable bracket for type bar actuator

The bracket 257, which guides the type bar actuator 43, may be swung upwardly to an abnormal position so as to provide clearance for the type carrier for the purpose of detaching the latter from the machine, when it is desired to replace it by another one having a different style of types. To this end the bracket or guide frame 257 is pivotally supported at 267, Fig. 1, on the front plate 66 about which it may be swung. A manually operable latch 268 is pivotally supported at 269 on the bracket 257 and engages a keeper 270 to hold the bracket 257 in its normal position, the keeper 270 being secured to a bracket 271 on the front plate 66. This feature is more fully illustrated and described in my above mentioned application.

Power drive

The motor 50 of the power drive is supported by a bracket 275, Figs. 1 and 3, to which it is secured by screws or bolts 276, the bracket 275 being secured to the base plate 68 by screws 277. The motor includes a shaft 280 having secured thereto a worm 281 which meshes with a worm wheel 282 secured to the shaft 51 to rotate the latter, the worm 281 and worm wheel 282 being located in a housing 284 in the form of an extension of the motor casing.

The shaft 51 extends transversely of the machine and is located at the rear and near the lower part thereof. It is supported in bearing portions 285 and 286 of the housing 284 and is connected at one end by a slightly resilient coupling 287 with a crank shaft 288 rotatably supported in bearing brackets 289 and 290 secured to a cross bar 291 integral with the base plate 68. The crank shaft 288 may includes one or more crank pins 292, Figs. 1 and 5, three being shown in the present form of the invention, each having attached thereto a connecting rod 293. Each connecting rod is connected at its forward end, by a stud 294, to a clutch element 295, all of the clutch elements 295 being loosely supported on the rock shaft 154 to oscillate, ordinarily, freely thereon. The shaft 154 is supported in brackets 296 and 297 secured to the base plate 68 and may be rocked, to actuate the cam element thereon, by any one of the clutch elements 295 in a manner now to be described. The ends of the shaft 154 are reduced, see Fig. 4, thus providing shoulders which bear against the brackets 296 and 297 to thus prevent sidewise displacement of the cam element 53.

Clutch

From the foregoing description it will be understood that the clutch elements 290 are thus continually reciprocated by the continually rotating crank shaft 288 through the medium of the connecting rods 293, that the crank pins 292 are spaced from each other equal angular distances about the axis of the crank shaft 288 so that the three clutch elements arrive at their foremost and rearmost positions successively at equally timed intervals, and that each clutch element, because of the harmonic motion produced by the crank shaft 288, is momentarily at rest while the corresponding crank pin passes over the dead center.

To connect the shaft 154 with any one of the clutch elements 295 each of said elements has associated therewith a cooperative clutch element 300, Figs. 11, 12, 13 and 14, secured to the rock shaft 154 by a pin 301ª which passes through a hub 302 of the clutch element 300. The clutch elements 295 and 300 are arranged adjacent to each other to form a set and the various sets are arranged adjacent to each other on the shaft 154, the clutch elements 295 being always in alignment with each other.

Any one of the clutch elements 295 is connectable, while in its foremost or in its rearmost position, as hereinafter described, with its cooperative element 300 to drive the latter and thus actuate the shaft 154. To this end there is provided a pawl or connecting member 301, Figs. 12, 13 and 14, pivoted by a stud 302, on a bracket 303 secured to the clutch element 295. Each pawl 301 is normally held, by a spring 304, with its upper end in the bottom of a slot 305 of a lip 306 on the clutch element 295. While the pawls 301 are in the bottoms of the slots 305 the driving clutch elements 295 may reciprocate idly back and forth.

Any one of the pawls or coupling members 301 may be swung about its pivot to its effective position, see upper righthand one in Fig. 23, by means hereinafter described, where a lug 307 of the pawl 301 engages in a slot 308 of a member 309ª secured to an arm 309 of the driven clutch element 300. The pawl 301 does not move entirely out of the slot 305 of the driving element 295, and consequently when thus connected, the driven clutch element 300 is caused to move with the driving element 295. The connecting movement of the pawl 301 occurs while the driving element 295 is in its foremost position where, it will be remembered, it is momentarily at rest due to its reversal of motion.

Only one of the pawls 301 is operable at a time and the active one is held in its connected position, while the coupled clutch elements are functioning. This is accomplished by any one of a series of locking dogs 310, Figs. 13 and 14, one being associated with each of the pawls 301. Each locking dog has a lip 311 which, while the clutch element 295 is in its rearmost position, is held clear of the connecting pawl 301 by a stop 312 adjustably supported on a fixed bracket plate 313. Each dog 310 is pivotally supported on the driving element 295 by a stud 314 and has an ear 315 which is normally held against the stop 312 by a spring 316 connected to the upper end of the dog.

Figure 14:
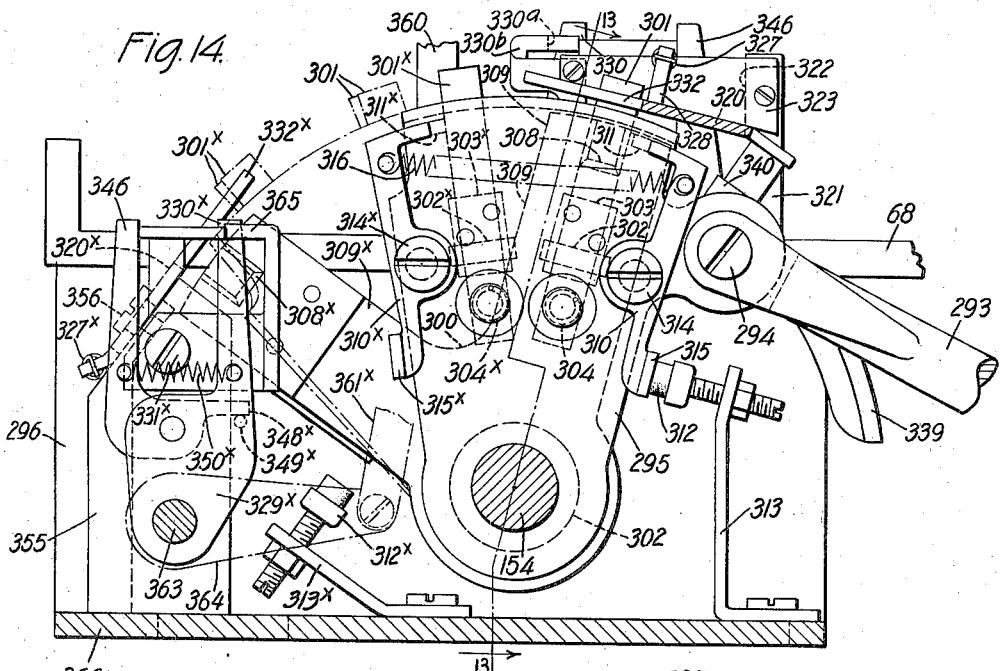
Fig. 14 is a sectional side view of the clutch taken on the line 14—14 of Fig. 4.

From the foregoing it will be understood that while the driving element 295 is in the position of Fig. 14 the locking dog 310 is inactive and the leading end of the lip 311 stands slightly clear of, or in other words out of contact with, the connecting pawl 301. Immediately after the connecting element 301 has been actuated, to connect the driving element 295, the latter is moved in a counter-clockwise direction, Fig. 14, thus taking the driven element 300 with it to rock the shaft 154 in the same direction for the purpose of actuating the cam element 53 as previously described. As soon as this motion of the driving element 295 starts the dog 310 swings in a counter-clockwise direction, Fig. 14, under the action of the spring 316 to carry the lip 311 behind the pawl 301 as in Figs. 16 and 24 to lock said pawl in engagement with the cooperative clutch element 300. Thus the connecting pawl 301 remains locked for practically a complete cycle of operations or in other words until the driving element returns approximately to the position in Fig. 14. Just an instant prior to reaching this position the lip 311 reengages the stop 312 to effect the withdrawal of the lip 311 from the path of the connecting pawl 301 to permit the latter to be returned, to the bottom of the slot 305, by the spring 304, as in Fig. 13.

By an inspection of Figs. 3, 4, 12 and 13 it will be understood that the clutch may have a plurality of sets of elements 295 and 300 employed so that connection between the driving motor and the shaft 154 may be made in a shorter period of time than is possible with a single pair of clutch elements, the driving elements 295 reciprocating continually and rapidly and arriving in their rearmost position successively in uniform phase relation due to their connections through the rods 293 with the crank pins 292 which it will be remembered are equally spaced about the axis of the shaft 288.

To actuate any one of the connecting pawls 301, which may be effected only while it is in register with the slot 308 of the corresponding arm 309 of the cooperative clutch element 300, there is provided a slide 320, Figs. 12, 13, 14 and 23, extending transversely of all of the planes in which the clutch elements 295 operate, said slide being supported at its left end by a bracket 321 secured to base plate 68. The slide 320 is guided in the bottom of a slot 322 of the bracket 321 and held therein by a plate 323 extending over it and secured to the bracket 321. The other side of the pawl actuating slide 320 is supported by a shouldered screw 324 extending through an elongated slot 325 of said slide and threaded into a bracket 326 which is also secured to the base plate 68.

The slide 320 is urged leftwardly, Figs. 12 and 13, by a spring 327, connected at one end to a pin 328 on the slide 320 and at its other end to the guide plate 323, but is normally held back, in the position shown in Fig. 12, by a release lever 329, said lever having a finger 330 engaging the left end of the slide 320. The trip lever 329 is pivotally supported by a stud 331, on the bracket 321, about which it may be actuated in a counter-clockwise direction, Fig. 15, by hereinafter described means operable by the key levers, to withdraw the finger 330 from engagement with the slide 320 whereupon the spring 327 draws the slide leftwardly to actuate, through the medium of one of the fingers 332 thereon, the pawl 301 which registers with its slot 308 to the position shown in Fig. 23. To prevent undesirable lateral displacement of the release finger 330 it is guided in a slot 330ª, Fig. 12, of an ear 330ᵇ formed on the bracket 321.

It will be remembered that the actuation of the pawl 301 to its connecting position takes place while the continually reciprocating clutch element 295 is momentarily at rest due to its reversal of motion as in Fig. 23. At this time the other two driving clutch elements 295 are travelling in the directions indicated by the arrows thereon. The slide 320 has three fingers 332 one for each connecting pawl 301 so that any one of clutch elements 295 may be connected with its cooperative clutch element 300, the one being rendered effective having its pawl 301 in cooperative relation with its associated finger 332 of the actuating slide.

After the slide 320 has thus actuated the pawl 301 to connect the driving clutch element 295 with the driven clutch element 300, as in Fig. 23, the pawl is carried away from the slide to the position in Fig. 24; the other two driving clutch elements are at this instant located with respect to each other as shown and they are moving in the directions of the arrows thereon. It will be recalled that all of the driven clutch elements 300 are secured to the rock shaft 154, Fig. 15, consequently when any one of them is actuated the other two are actuated therewith, see Fig. 24.

To prevent undue shock to the clutch element when the connecting pawl 307 is moved into the slot 308 by the slide 320 there is provided an adjustable stop 335, Figs. 12, 13 and 25, threaded into an ear 336 of said slide 320 and engaging a fixed stop 338, in the form of an ear on the slide supporting bracket 326, to arrest the slide in its operated position.

Shortly after the driven clutch elements begin their forward movement from the position in Fig. 25, the return of the slide 320 to normal is started. For this purpose there is secured to one of the driven cam elements 300, preferably the one at the left of the group, a cam 339, Figs. 12, 13, 15 and 23, which engages a follower 340 on the slide 320 to push the latter back, against the action of the spring 327, to the position in Fig. 24, thus permitting the finger 330 to snap over the left edge of the slide 320 to thus hold the slide in its normal position. The cam 339 may then return to its normal position, Fig. 12. As the cam 339 reaches this position the connection of the active one of the driving clutch elements 295 becomes disconnected from its cooperative clutch element 300, as hereinbefore described, by releasing the connecting pawl 301.

The pawl actuating slide 320 is likely to be actuated at any time during the cycle of operations of the clutch driving elements 295 and at a time when not one of the pawls 301 is in register with the slot 308 of the cooperative clutch element 300 as in Fig. 26. Provision is therefore made to render effective the first pawl to register with its cooperative slot. To this end each finger 332 of the slide 320 is provided with a cam face 345 with which the rearwardly moving pawl 301 engages to partially push back the slide against the action of its spring 327, as in Fig. 27, but not far enough to let the release finger 330 snap over the edge of the slide so that said slide may again move leftwardly. As soon as the pawl 301 reaches the slot 308 it is forced into said slot by the slide 320, as in Fig. 28, under the action of the spring 327.

Another condition which may occur in the operation of the machine is that the return of the release finger may be delayed by unduly holding the key lever depressed. This would, unless guarded against in a manner hereinafter described, permit the slide 320 to again move leftwardly in Fig. 12 and thus prevent the release of the active connecting pawl 301 to effect a disconnection of the two coupled clutch elements 295 and 300. The result would be repeated printing of the same character.

Figure 15:
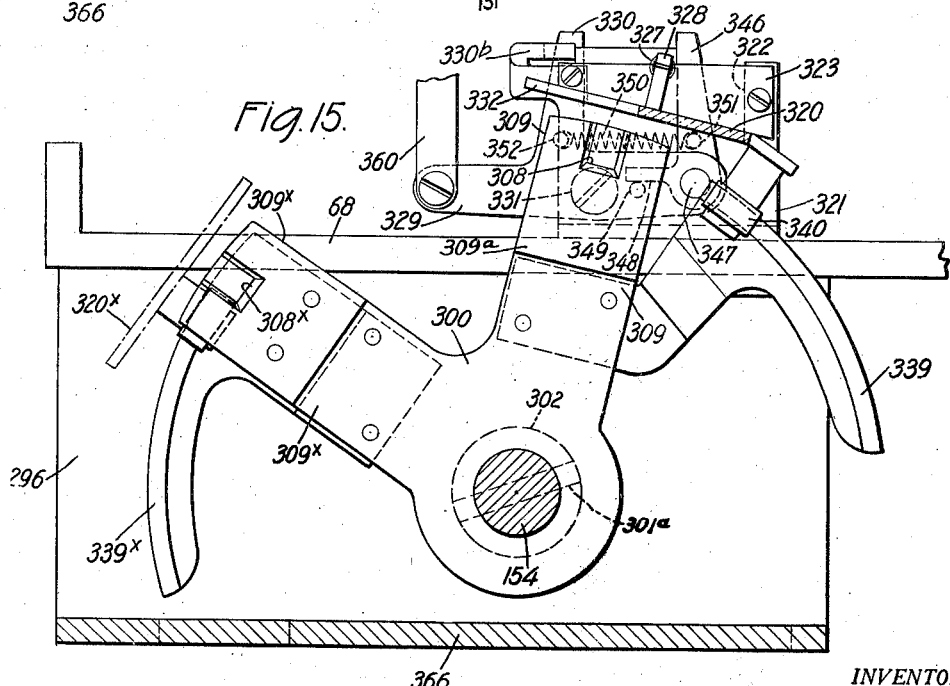
Fig. 15 is a vertical section of the clutch taken on the line 15—15 of Fig. 4.

To prevent repetition of the leftward movement of the slide 320 and resultant repeated printing, there is pivotally supported on the release lever 329 a pawl 346 by a stud 347, Fig. 15, said pawl having an arm 348 which is normally held against a stop pin 349 by the action of a spring 350, the latter being connected at one end to a pin 351 on the pawl 346, and at its other end to a pin 352 on the finger 330 of the release lever 329. Thus with this arrangement, when the release lever is actuated in a counter-clockwise direction, Fig. 15, to move the finger 330 out of the path of the slide 320 to release the latter, the pawl 346 remains in contact with the back of the slide, and the pawl has an idle motion at this time, in a clockwise direction about its pivot 347, relatively to its supporting lever 329, the tail 348 of the pawl leaving the stop pin 351 against the action of the spring 350.

From the above description it will readily be understood if the slide is restored to normal by the cam 339 on clutch element 330 while the lever 329 is still in its actuated position, that the pawl 346 snaps over the left edge of the slide due to the action of the spring 350, as in Fig. 29, to hold the slide while the cam 339 returns to normal and until the finger 330 returns to normal as in Fig. 12 to hold the slide. While the lever 329 which carries the finger 330 is being returned, by spring means hereinafter described, the pin 349 on said lever reengages the tail 348 of the pawl to move the latter out of the path of the slide 320. This does not occur, however, until the finger 330 has reentered the path of the slide. It will be understood that the active connecting pawl 301 is rendered ineffective to disconnect the driven clutch element 300 from the active driving element 295 irrespective of the position of the release lever 329 and that therefore repeated printing is avoided while the key lever is unduly held in its depressed position.

From the foregoing it will be understood that by connecting any one of the clutch elements 295 with the arm 309 of the associated clutch element 300 the cam element 53 may be actuated in a counter-clockwise direction from the position in Fig. 14 to the position in Fig. 16, and that during this time the cam slot portion 152 is effective to actuate the lever 54 in a counter-clockwise direction, as in Fig. 7, from its normal position, Fig. 3, to rotate the pinion 137 in a clockwise direction, Fig. 7, and thus rotate the type carrier 40 in the same direction to thus position any one of the type bars of the group at the left side of the type carrier at the printing point.

Provision is also made to position any one of the type bars of the group to the right of the type bar carrier at the printing point. To this end the cam element 53 is rocked, by means of the shaft 154, in a clockwise direction from its normal position, Fig. 1, to the position in Fig. 8 thus bringing into action the cam slot portion 153 to swing the actuating lever in a clockwise direction in Fig. 8 about the active fulcrum pin 56. For this purpose there is provided on each clutch element 295 another connecting pawl 301$^x$ pivotally supported in the same manner as the pawl 301 but by a separate stud 302$^x$ and a separate bracket 303$^x$. Each cooperative clutch element 300 is also provided with another arm 309$^x$ and these arms 309$^x$ occupy the position in Figs. 11 and 14 while the cam element 53 is in its normal position.

A pawl actuating slide 320$^x$ is supported on a bracket 355, Figs. 12 and 14, by screws 356, said bracket being secured to the base plate 68. The slide 320$^x$ extends over the free ends of the arms 309$^x$ and, at the proper time, is operable by its spring 327$^x$ to actuate any one of the pawls 301$^x$ while the driving clutch element 295 is in its forward position, Fig. 18, to connect the latter to the cooperative clutch element 300 through the medium of the arm 309$^x$. It will be understood that this connection of the clutch elements 295 and 300 is also effected while the driving clutch element 295 is momentarily at rest in its forward position due to its reversal of motion. When the connected driving clutch element moves rearwardly the shaft 154 is rocked thereby in a clockwise direction to the position in Fig. 17 thus actuating the cam element 53 in the same direction to effect the actuation of the lever 54 as in Fig. 8.

The pawls 301$^x$ are actuated, in a manner similar to the pawls 301, by the slide 320$^x$, and the slide is actuated by a similar spring 327$^x$ and the release of the slide 320$^x$ is controlled by similar mechanism including a lever 329$^x$ having a finger 330$^x$, said lever carrying also a pivoted pawl 346$^x$ actuatable by a spring 350$^x$. Locking dogs 310$^x$ similar to the locking dogs 310 are also provided for the connecting pawls 301$^x$ and these locking dogs are engaged by stops 312$^x$, supported on a bracket plate 315$^x$, to restore them to their normal positions thus enabling the active pawl 301$^x$ to be restored to normal by its spring 304$^x$, Fig. 14, to thereby effect a disconnection of the driving clutch element 295 from its cooperative clutch element 300.

It will be understood that the pawls 301$^x$, dogs 310$^x$, pawl actuating slide 320$^x$ and slide release lever 329$^x$ and the parts associated with these elements are similar to and function similarly to the elements 301, 310, 320 and 329 and their associated parts. All of the parts, associated with the elements 301$^x$, 310$^x$, 320$^x$ and 329$^x$ not above identified, as well as the elements themselves, bear the same characters as the elements 301, 310, 320 and 329 and their associated parts except that they have added thereto the superscript $x$.

From the foregoing it will be understood that the cam element 53 is operable in either direction from its normal position, Fig. 11, in other words rearwardly or forwardly of the machine, through the medium of the pawls 301 and 301$^x$ respectively, one at a time, and that said cam element is returned to its normal position by the active pawl, from which it follows that said pawls are rendered active at the beginning of a cycle and are rendered inactive at the completion of a cycle of operations while the cam is in the position in Fig. 11.

*Clutch release actuating means*

The mechanism which actuates the clutch release lever 329 to effect a connection of the power means with the type bar carrier so that the driving end of the lever 54 is actuated leftwardly, as in Fig. 7, from its normal position, is best illustrated in Figs. 2, 4 and 11, and includes the universal bar 61 which, it will be remembered, is operable against the action of the return spring 114, by any one of the group A of key levers 57. Thus the rock shaft 111 is actuated in the direction of the arrow, indicated thereon in Fig. 4, to thereby move a link 360 (see Fig. 4 also) downwardly through the medium of a forwardly extending arm 361 secured to said rock shaft. The link 360 is connected, at its lower end, to the release lever 329 and consequently when actuated downwardly it actuates the release lever 329 in a counter-clockwise direction, Fig. 11, to release the slide 320 as hereinbefore mentioned.

To effect a connection of the power means with the type bar carrier to actuate the driving end of the lever 54 leftwardly, as in Fig. 8, from its normal position, the rock shaft 111$^x$ has secured thereto an arm 361$^x$, Figs. 4 and 11, so that when the universal bar 62 is actuated by the depression of any one of the key levers 57 of the group B to the right of the machine, a link 360$^x$ is moved downwardly thereby to rock a shaft 363 in a clockwise direction, Fig. 11, through the medium of an arm 364 secured to the shaft 363, the latter being supported in the bracket 297 and the bracket 355. The release lever 329$^x$ is secured to the rock shaft and therefore when the rock shaft 363 is actuated in a clockwise direction said release lever 329$^x$ is actuated to disengage the finger 330$^x$ from the shoulder 365 of the slide 320$^x$ to release the latter so that it may function as previously described to actuate one of the pawls 301$^x$.

A plate 366, Fig. 4, is secured to the lower ends of the brackets 296 and 297, for the purpose of supporting the bracket 355, upon which the slide 320$^x$ is mounted, and the stop supporting plates 315 and 315$^x$, Fig. 16.

As previously pointed out the cam element 53 is always returned to its normal position, Figs. 1, 11, 30 and 31, at the completion of a cycle of operations. It will be remembered that said cam element is also disconnected in this position. Consequently, unless otherwise guarded against, it may be accidentally displaced from this position which would be objectionable. Provision is therefore made to prevent such accidental displacement of the cam element. To this end there is coiled around the shaft 154, which supports the cam element 53, a spring 368, Figs. 11, 30 and 31, which is kept from contacting with said shaft by a sleeve 369 secured to a bracket 370 fastened to the plate 366. The ends 371 and 372 of the spring 368 bear against a fixed stop 373 on the bracket 370. A projection 374 on the side of the cam element 53 extends between the spring ends 371 and 372 so that irrespective of the direction of movement of the cam element 53 the projection 374 acts against one of said spring ends or arms to flex the spring. It should be understood that both of the spring arms 371 and 372 press normally against the opposite faces of the stop 374 and also against the opposite faces of the projection 373 and thus tend to hold the cam in its normal position against accidental displacement; the arms 371 and 372 yield however during the actuation of the cam by the motor. To prevent noise which may result from direct contact of the arms 371 and 372 with the stop 374, said arms and said stop are covered with sleeves 375, 376 and 377, respectively, of any suitable sound deadening material such as rubber.

Indexing mechanism for type bar carrier

As previously described the type bar carrier 40 is positioned to present the various type bars, one at a time, to the type bar actuator 43 and this is effected by varying the motion at the driving end of the actuating lever 54 through the fulcrum pins 56. To further aid in positioning the type bar carrier so as to locate the selected type bar accurately at the printing point there is provided suitable indexing means which may be like that disclosed in my above mentioned application and includes a ring 378, Fig. 1, secured to the type bar carrier 40, said ring having apertures 378$^a$ one for each type bar. A plunger or aligning pin 378$^b$ is guided in a suitable bracket and is actuatable to enter the aperture corresponding to the selected type bar prior to the printing operation of each type bar.

To actuate the indexing or aligning pin 378$^b$ the lever 251 actuates an arm 379 to rock a shaft 379$^a$ mounted in a fixed bracket 379$^b$. The shaft 379$^a$ has secured thereto an arm 379$^c$ which through a link 379$^d$ actuates a lever 379$^e$ to swing the latter clockwise about its pivot 379$^f$. The lever 379$^e$ has a pin and slot connection 379$^g$ with the pin 378$^b$ and consequently when said lever is actuated as above described the aligning pin 378$^b$ is projected into the aperture 378$^a$, Fig. 1, of the ring 378 on the type bar carrier. After this has taken place the type bar 41 is actuated by the actuator 43 to print against the platen 44.

It will be understood that the aligning pin 378$^b$ enters the ring aperture 378$^a$ and the actuator 43 actuates the type bar 41 while the cam follower 146 is on the dwell 155 or the dwell 156 of the cam element 53 or, in other words, after the type carrier has been arrested in its effective position.

Ribbon vibrating mechanism

The ribbon 45, through which the type bars print, is supported by a ribbon vibrator 380, Figs. 1, 32 and 33, having two vertical legs 381 by which it is guided in brackets 382 and 383 secured to the cross bar 132, the lower ends of said legs being connected to each other by a bar 384. The ribbon is normally below the printing line and is vibrated into the path of the active lower case type 56 at each printing operation. For this purpose the arm 246 of the plunger actuating mechanism, Fig. 1, pulls a link 385 forwardly to rock a bell-crank 386 in a clockwise direction about a pivot stud 387 by which the bell-crank is supported on a bracket 388 secured to the cross bar 132. The link 385 is pivotally connected to an arm 389 of the bell-crank 386 and the other arm 390 of the bell-crank has a slot 390$^a$ in which the rod 384 of the ribbon vibrator engages. Thus it will be understood that when the bell-crank is actuated clockwise, Fig. 1, the ribbon vibrator is lifted to present the ribbon to the type 46 of the active type bar.

By an inspection of Fig. 1 it will be observed that the ribbon 45 is normally in the path of the upper case type 47 but no printing is effected because the platen is set in its upper position for printing with the lower case types 46. It is not necessary therefore to vibrate the ribbon while printing with the upper case types 47. Provision is made, therefore, to prevent the vibration of the ribbon while the platen is in its upper case position. To this end there is secured to the rail 81, upon which the carriage travels, a downwardly projecting finger 391 which normally is located clear of the arm 390 and is carried downwardly, while the platen is being shifted in the same direction to its upper case position, against the arm 390 to lock the latter against actuation as in Fig. 33 and thereby hold the ribbon vibrator in its normal position.

To prevent interference with the actuation of the link 385 and its actuating arm 246 while the arm 390 is locked by the finger 391, the arms 389 and 390 of the bell crank 386 are resiliently connected to each other by a spring 392, both of said arms being pivotally supported on the stud 387 and the arm 389 being normally held against an ear 393 of the arm 390 by the spring 392. Thus it will readily be understood that if the link 385 is actuated while the arm 390 is obstructed by the finger 391, as in Fig. 33, the bell crank arm 389 moves idly forward away from the ear 393, against the action of the spring 392, said spring causing the arm 389 to return to the ear 393 upon the return of the link 385 to normal.

Carriage feed

The letter feed movements of the carriage are effected by escapement mechanism indicated generally by the numeral 394, Fig. 1, which is operable in a manner presently to be described. The carriage 72 may be urged in a letter feed direction by a spring drum, not shown, and tends to rotate an escapement wheel 395 through the medium of a rack 396 on said carriage which rack meshes with a pinion 397 having the usual one way driving connection, not shown, with the escapement wheel 395 to rotate the latter about a pivot stud 398 secured to the shift frame 92. A dog rocker 399 is pivoted by studs 400 in lugs 400$^a$ on the shift frame 92, said dog rocker having dogs 401 and 402 which cooperate with the teeth of the escapement wheel 395, as the dog rocker is oscillated back and forth about the pivot studs 400, to thus effect the step-by-step letter feed movements of the carriage.

The dog rocker 399 is oscillated back and forth at each printing operation by a link 403$^a$ which is pivotally connected at its rear end with the lower end of an arm 403 of the dog rocker, said link being also pivotally connected at its forward end to the link 385 which it will be remembered is reciprocated by the arm 246 at each cycle of operations. It will be understood that another advantage of the resilient connection (spring 392) between the arms 389 and 390 of the bell crank is that it permits the actuation of the dog rocker 403, see Fig. 33, while the arm 390 is locked against actuation by the finger 391.

Brief description of operation of the machine

A suitable main switch, not shown, is closed to start the motor 50, Figs. 1 and 3, to drive the crank shaft 288 and thereby continually reciprocate the driving clutch elements 295, see Fig. 14 also, through the medium of the connecting rods 293. Any one of the key levers 57 may then be operated. If the key lever being actuated is of the group A, Fig. 4, the associated universal bar 61 is actuated to operate the lever 329 to release the slide 320 so that it may be actuated by its spring 327 to actuate any one of the pawls 301, whichever happens to be in its path, and thus connect the corresponding driving clutch element 295 with its associated clutch element 300 so that as the driving element 295 moves rearwardly the element 300 is caused to move with it to rock the shaft 154 to which, it will be remembered, all of the driven elements 300 are rigidly secured. While the shaft 154 is being thus rocked the cam element 53 thereon actuates the lever 54 about the previously set fulcrum pin 56 to actuate the rack carrying lever 139 to rotate the type carrier through the medium of the pinion 137 on shaft 42 to which the type carrier is secured. The connecting pawl 301 is held in its effective position by the dog 310 until the clutch element 295 returns to its forward position when dog 310 is rendered ineffective by the stop 312 so that the pawl 301 may be returned to normal, out of engagement with the cooperative clutch element 300, by its spring 304 and thus disconnect the cam supporting shaft 154 from the continually rotating crank 288.

During the early part of the driving stroke of the connected clutch element 300, the cam 339 on one of elements 300 returns the slide 320 to normal and if in the meantime the key lever has returned to normal, the universal bar return spring 114, Fig. 4, becomes effective to restore the slide release pawl 339 to normal through the medium of the link 360. In case the return of the release lever, and its finger 330, is delayed, as in Fig. 29, the pawl 346 snaps over the edge of the slide as indicated to temporarily hold the slide until the finger 330 returns.

If one of the key levers in the group B is actuated the connection of two of the clutch elements 295 and 300 is effected through one of the pawls 301x, which is accomplished by the actuation of the slide 320x, and the actuating lever 54 is operated in a direction opposite to that in Fig. 7 from its normal position, as indicated in Fig. 8.

While any one of the key levers is being depressed the corresponding rock shaft 175 is actuated thereby to operate the associated transverse slide 177, the latter actuating the connected bell crank 181 to get the associated fulcrum pin 56 into the corresponding aperture 160 of the lever 54, the fulcrum pin 56 being set into said aperture before the finger of the release lever 329 has moved clear of the slide 320 to release the latter.

After the fulcrum pin 56 has been set and the slide 320 is released, the shaft 154 is rocked through the medium of the connected clutch elements 295 and 300 to rotate the shaft 42 and the connected type carrier 50 to set the type bar, corresponding to the depressed key lever, into the path of the type bar actuator 43. The type bar carrier may then be indexed, by the means which include the pin 378, to accurately position the selected type bar at the printing point. This actuation of the indexing means occurs after the lever 54 reaches its operated position and while the follower 146 of said lever is in the dwell 155 of the cam slot 147. While the indexing means is effective the type bar is caused to print through the ribbon 47 on a work sheet, not shown, around the platen 55, the plunger or type bar actuator 43 being operated by the mechanism connected to the upwardly extending arm on the rock shaft 154.

During the return movement of the rock shaft 154, the type bar carrier 40 is returned to normal by the cam element 53 and the active connecting pawl 301 is then rendered ineffective. This completes a cycle of operations.

Some of the features herein mentioned are briefly described and are more fully described in my above mentioned application in which they are also claimed.

While certain preferred embodiments of the invention have been shown and described, it will be understood that changes in the form, arrangements, proportions, sizes and details thereof may be made without departing from the scope of the invention as defined in the appended claims.

I claim:

1. In a typewriting machine, the combination of a type carrier having a plurality of types thereon, rotatable means whereby the type carrier may be actuated in opposite directions from a normal position to juxtapose any one of the types at a printing point, a cam, means connecting said cam with said rotating means, the connecting means including a follower always in engagement with said cam, and means independent of said follower to actuate said cam in either one of two opposite directions from a normal position to correspondingly actuate the rotating means and thus actuate the type carrier in either direction from its normal position, said cam being effective to gradually start and stop the motion of said type bar carrier.

2. In a typewriting machine, the combination of a type carrier having a plurality of types thereon, rotatable means whereby the type carrier may be actuated in opposite directions from a normal position to juxtapose any one of the types at a printing point, a cam, a lever operable by said cam to actuate said rotatable means, fulcrum varying means for said lever to vary its throw and thus accordingly vary the extent of actuation of the type bar carrier, and means to actuate said cam in opposite directions to accordingly actuate the rotating means.

3. In a typewriting machine, the combination of a type carrier having a plurality of types thereon, rotatable means whereby the type carrier may be actuated in opposite directions from a normal position to juxtapose any one of the types at a printing point, means including a lever to actuate said rotatable means, a member on said lever, a cam device having a cam slot therein into which said member extends, means to actuate said cam device in a direction lengthwise of said lever to actuate said lever, and means to prevent movement of said cam device transversely of said lever while it is actuating said lever.

4. In a typewriting machine, the combination of a type carrier having a plurality of types thereon, rotatable means whereby the type carrier may be actuated in opposite directions from a normal position to juxtapose any one of the types at a printing point, means including a lever to actuate said rotatable means, a rock shaft, a dual acting cam on said rock shaft to actuate said lever in opposite directions from a normal position, and means to selectively actuate said rock shaft in opposite directions from a normal position to accordingly actuate said lever and the rotatable means.

5. In a typewriting machine, the combination of a type carrier having a plurality of types thereon, means to actuate said type carrier to juxtapose any one of the types with respect to a printing point, the actuating means including a cam, and an element operable by said cam always through the same extent to drive the type carrier, key levers, means common to the key levers and operable thereby to effect the actuation of said cam, and means to vary the extents of movement imparted by the operable element to the type carrier.

6. In a typewriting machine, the combination of a type carrier, types thereon, means to actuate said type carrier to juxtapose any one of the types at the printing point, a cooperative element to engage the juxtaposed type to cause it to print, said means including a lever, a cam engaging said lever, and means to reciprocate said cam to drive the actuating lever to its operated position and to restore it to normal, said cam having a dwell at its end to bring the actuating lever to rest and to retain it in this condition while the printing action of the cooperative element occurs.

7. In a typewriting machine, the combination of a type carrier, types thereon, rotatable means to actuate said type carrier to juxtapose any one of the types at the printing point, a cooperative element to engage the juxtaposed type to cause it to print, means including a lever to actuate the rotatable means, a cam element having two cams, an intermediate dwell located between said cams, and two dwells one at the end of each cam, means including a lever to actuate said rotatable means, a member on said lever and engaging said cam element, said member being normally located at the intermediate dwell, means to selectively actuate said cam element in either direction from its normal position to accordingly operate the actuating lever in either direction from its normal position, the end dwells being effective one at a time to retain said lever at rest in its active position while the printing action of the cooperative element occurs.

8. In a typewriting machine, the combination of a type carrier, types thereon, rotatable means to actuate said type carrier to juxtapose any one of the types at the printing point, a cooperative element to engage the juxtaposed type to cause it to print, means including a lever to actuate the rotatable means, and a cam to actuate said lever, said cam being effective to always impart the same extent of movement to said lever and to gradually start and stop the movements of said lever, power means, intermediate means whereby the power means may be connected with said cam to drive it to its operated position and restore it to normal, and means to vary the extents of the movement imparted by said lever.

9. In a typewriting machine, the combination of a type carrier, types thereon, rotatable means to actuate said type carrier to juxtapose any one of the types at the printing point, a cooperative element to engage the juxtaposed type to cause it to print, means including a lever, and a cam to actuate said lever, said cam being effective to always impart the same extent of movement to said lever and to gradually start and stop the movements of said lever, power means, intermediate means, key levers, means operable by the key levers to render the intermediate means effective so that the power means may actuate said cam and means to vary the extents of the movements imparted by said lever.

10. In a typewriting machine, the combination of a type carrier, types thereon, rotatable means to actuate said type carrier to juxtapose any one of the types at the printing point, a cooperative element to engage the juxtaposed type to cause it to print, means including a lever to actuate the rotatable means, a driving element arranged to operate in a plane extending at right angles to the plane in which said lever operates, said element to actuate said lever in opposite directions from a normal position, power means, and means whereby the driving element may be connected with the power means to actuate said driving element in opposite directions from a normal position to accordingly actuate said lever and the connected type carrier.

11. In a typewriting machine, the combination of a type carrier having a plurality of types thereon, rotatable means whereby the type carrier may be actuated in opposite directions from a normal position to juxtapose any one of the types at a printing point, a cam element having two cams thereon, means including a lever to actuate said rotatable means, a member on said lever to be engaged by said cams one at a time to actuate said lever in either direction from a normal position, reciprocating power means, intermediate means, and means to selectively connect the power means with said cam element through the medium of the intermediate means.

12. In a typewriting machine, the combination of a type carrier having a plurality of types thereon, rotatable means whereby the type carrier may be actuated in opposite directions from a normal position to juxtapose any one of the types at a printing point, a dual acting cam element, continually reciprocating power driven means, a clutch having two devices, two groups of key levers, two universal bars one for each group of key levers to be actuated by any one of the key levers of the associated group, means operable by each universal bar to actuate one of said devices to render effective said clutch element to thus connect the power means with said cam element.

13. In a typewriting machine, the combination of a type carrier, types thereon, means to actuate said type carrier to juxtapose any one of the types at the printing point, a cooperative element to engage the juxtaposed type to cause it to print, said means including a lever, a cam to actuate said lever, continually running reciprocating means, key levers, and means operable by the key levers to connect said cam with said reciprocating means while the latter is momentarily at rest due to a reversal of motion.

14. In a typewriting machine, the combination of printing instrumentalities including a type carrier, rotatable means to actuate said type carrier to register one of the types with the printing point, a cam to operate the actuating means, a continually reciprocating power operated device, means to connect said cam with the reciprocating device while the latter is momentarily at rest due to a reversal of its motion, and means to effect a disconnection of said reciprocating device from said cam after the latter has made a complete cycle.

15. In a typewriting machine, the combination of printing instrumentalities including a type carrier, rotatable means to actuate said type carrier to register one of the types with the printing point, a cam to operate the actuating means, a continually reciprocating power operated device, a key lever, means under the control of the key lever to connect the cam with said reciprocating device while the latter is momentarily at rest due to a reversal of motion, and means to effect a disconnection of said reciprocating device from said cam after the latter has been restored to its normal position.

16. In a typewriting machine, the combination of printing instrumentalities including a type carrier, means to actuate said type carrier, a cam to operate the actuating means, a continually reciprocating power operated device, means to connect said cam with the reciprocating device while the latter is momentarily at rest due to a reversal of its motion, and means to effect a disconnection of said reciprocating device from said cam after the latter has made a complete cycle.

17. In a typewriting machine, the combination of printing instrumentalities including a type carrier, means to actuate said type carrier, a cam to operate the actuating means, a continually reciprocating power operated device, a key lever, means including a pawl to connect the cam with the reciprocating device, means under the control of said key lever to effect the actuation of said pawl to its effective position while the reciprocating device is momentarily at rest due to a reversal of motion, and means to render said pawl ineffective when the reciprocating device has completed a cycle.

18. In a typewriting machine, the combination of printing instrumentalities including a type carrier, means to actuate said type carrier, a cam to operate the actuating means, a continually reciprocating power operated device, a key lever, means including a pawl to connect the cam with the reciprocating device while the latter is momentarily at rest due to a reversal of motion, means under the control of said key lever to effect the actuation of said pawl to its effective position, means to hold said pawl in its effective position while the cam is being operated, and means to render said pawl ineffective when the reciprocating device has completed a cycle.

19. In a typewriting machine, the combination of a type carrier having a plurality of types thereon, rotatable means whereby the type carrier may be actuated in opposite directions from a normal position to juxtapose any one of the types at a printing point, a cam element having two cams thereon, means including a lever to actuate said rotatable means, a member on said lever to be engaged by said cams one at a time to actuate said lever in either direction from a normal position, reciprocating power means, intermediate means, means to selectively connect the power means with said cam element through the medium of the intermediate means to drive said cam element to its actuated position and to restore it to normal, and means to prevent accidental displacement of said cam element from its normal position.

20. In a typewriting machine, the combination of printing instrumentalities including a type carrier having a plurality of types arranged side-by-side thereon, actuating means to operate said type carrier to juxtapose any one of the types at the printing point, a driven element connected to said actuating means, continually reciprocating power driven means, means to connect the driven element with the reciprocating means to actuate the driven element in either direction from a normal position, means to disconnect the driven element from the reciprocating means at the completion of a cycle, and means to prevent accidental displacement of the driven element from its normal position.

21. In a typewriting machine, the combination of printing instrumentalities including a type carrier having a plurality of types arranged side-by-side thereon, actuating means to operate said type carrier to juxtapose any one of the types at the printing point, a driven element connected to said actuating means, a continually reciprocating power driven element, a device on one of said elements to connect the driven element with the reciprocating element while the latter is momentarily at rest due to a reversal of motion, means to render said device inactive at the completion of a cycle of said reciprocating element and means to prevent accidental displacement of the driven element from its normal position.

22. In a typewriting machine, the combination of printing instrumentalities including a type carrier having a plurality of types arranged side-by-side thereon, actuating means to operate said type carrier to juxtapose any one of the types at the printing point, a driven element connected to said actuating means, a rock shaft to which the driven element is secured, a continually reciprocating power driven element loosely supported on said rock shaft and to swing about the axis of said shaft, a device on the reciprocating element, means to actuate said device while the reciprocating element is momentarily at rest due to a reversal of motion to thus connect the driven element with the reciprocating element, means to effect a release of the driven element from the reciprocating element at the completion of a cycle of the reciprocating element, and resilient means to prevent accidental rotation of said rock shaft to hold the driven element in its normal position while it is disconnected.

23. In a typewriting machine, the combination of a type carrier, actuating means to operate said type carrier in opposite directions from a normal position, continually running power means, a clutch whereby the actuating means may be connected with said power means, said clutch including a continually reciprocating element operable by said power means, and a driven clutch element connected with said actuating means, and means to connect said driven clutch element with said reciprocating clutch element in either one of the extreme opposite positions of said reciprocating element so that the driven element may be actuated in opposite directions from a normal position to correspondingly operate the actuating means and the type carrier.

24. In a typewriting machine, the combination of a type carrier, actuating means for said type carrier, continually running power means, a clutch whereby the actuating means may be connected with the power means, said clutch including a continually reciprocating element driven by the power means, a cooperative clutch element connected to the actuating means, and an interponent on one of said clutch elements, a device to actuate said interponent to connect the two clutch elements, means tending to actuate said device, holding means to prevent the actuation of said device, key levers, and means operable by the key levers to render said holding means inactive to thus effect the actuation of said device.

25. In a typewriting machine, the combination of a type carrier, actuating means for said type carrier, continually running power means, a clutch whereby the actuating means may be connected with the power means, said clutch including a continually reciprocating element driven by the power means, a cooperative clutch element connected to the actuating means, a connecting element supported on one of the clutch elements, a slide to actuate said connecting element, a spring tending to actuate said slide, a latch normally holding said slide against the action of said spring, and means to actuate said latch to release said slide.

26. In a typewriting machine, the combination of a type carrier, actuating means for said type carrier, continually running power means, a clutch whereby the actuating means may be connected with the power means, said clutch including a continually reciprocating element driven by the power means, a cooperative clutch element connected to the actuating means, a connecting element supported on one of the clutch elements, a slide to actuate said connecting element, a spring tending to actuate said slide, a latch normally holding said slide against the action of said spring, means to actuate said latch to release said slide, means to return said slide to normal, and means to render said connecting element inactive when the driven clutch element has been returned to normal.

27. In a typewriting machine, the combination of a type carrier, actuating means for said type carrier, continually running power means, a clutch whereby the actuating means may be connected with the power means, said clutch including a continually reciprocating element driven by the power means, a cooperative clutch element connected to the actuating means, a connecting pawl pivotally supported on the reciprocating clutch element, a normally ineffective slide, means to render said slide effective to actuate said pawl to connect the reciprocating clutch element with the driven clutch element so that the type carrier actuating means may be operated by said power means, a locking device for said pawl, said locking device being pivotally supported on the reciprocating clutch element, means to restore said slide to normal, means to render said locking device inactive upon the return of the driven clutch element to normal, and means to subsequently restore the connecting pawl to normal to thus disconnect the reciprocating clutch element from the driven clutch element.

28. In a typewriting machine, the combination of a type carrier, a plurality of key levers, actuating means for said type carrier, said actuating means being under the control of said key levers, continually running power means, a clutch whereby the actuating means may be connected with the power means, said clutch including a continually reciprocating element driven by the power means, a cooperative clutch element connected to the actuating means, and an interponent on one of said clutch elements, a device to actuate said interponent to connect the two clutch elements, means tending to actuate said device, holding means to prevent the actuation of said device, means operable by any one of the key levers to render said holding means inactive, means to actuate said device after the holding means has been rendered ineffective, means on said driven clutch element to restore said device to its inactive position, means to render said interponent inactive upon the return of the driven clutch element to normal, and means to vary the extents of movements imparted to the type carrier by said actuating means.

29. In a typewriting machine, the combination of a type carrier, actuating means for said type carrier, continually running power means, a clutch whereby the actuating means may be connected with the power means, said clutch including a continually reciprocating element driven by the power means, a cooperative clutch element connected to the actuating means, a connecting element supported on one of the clutch elements, a slide to actuate said connecting element, a spring tending to actuate said slide, a latch normally holding said slide against the action of said spring, means to actuate said latch to release said slide so that the latter may be operated by said spring to thereby actuate the connecting element, a cam on the driven clutch element to restore said slide against the action of said spring and to render it under the control of said latch, and means to render said connecting element inactive upon the return of the driven clutch element to normal.

30. In a typewriting machine, the combination of a type carrier, actuating means for said type carrier, continually running power means, a clutch whereby the actuating means may be connected with the power means, said clutch including a continually reciprocating element driven by the power means, a cooperative clutch element connected to the actuating means, and a coupling element on one of said clutch elements, a device to actuate said coupling element to connect the cooperative clutch element with said driving clutch element, means on the clutch element which supports the coupling element to lock the latter in its connected position while the clutch elements are functioning, means to restore to normal the device which actuates the coupling element, and means to render said locking means inactive when the driven clutch element is returned to normal.

31. In a typewriting machine, the combination of a type carrier, actuating means for said type carrier to juxtapose any one of the types with respect to the printing point, said actuating means including a rock shaft, a driven element secured to said rock shaft, a driving element mounted on said rock shaft for reciprocatory movement independent of said shaft, continually running power means to operate said driving element, and means whereby the driven element may be connected with the driving element to thereby actuate said rock shaft and the connected type bar carrier.

32. In a typewriting machine, the combination of a type carrier, actuating means for said type carrier to juxtapose any one of the types with respect to the printing point, said actuating means including a rock shaft, a driven element secured to said rock shaft, a driving element mounted on said rock shaft for reciprocatory movement independent of said shaft, continually running power means to operate said driving element, two connecting devices, and means to actuate either connecting device to connect the driven element with the driving element in either of two positions so that the type carrier may be actuated in either direction from a normal position.

33. In a typewriting machine, the combination of printing instrumentalities including a type carrier, means to actuate said type carrier, power driven means, a plurality of continually reciprocating elements actuated by the power driven means, said elements being arranged with respect to each other to move successively at uniform intervals to a momentary rest position, a plurality of cooperative elements one for each reciprocating element, said cooperative elements being connected to the actuating means and being normally at rest, the reciprocating elements and the cooperative elements being arranged in a plurality of sets, a plurality of connecting elements one on each reciprocating element, an actuator common to all of the connecting elements, and means to effect the operation of said actuator to set the connecting element which happens to be momentarily at rest due to a reversal of motion of the reciprocating element by which it is carried.

34. In a typewriting machine, the combination of printing instrumentalities including a type carrier, means to actuate said type carrier, power driven means, a plurality of continually reciprocating elements actuated by the power driven means, said elements being arranged with respect to each other to move successively at uniform intervals to a position of momentary rest, a plurality of cooperative elements one for each reciprocating element, said cooperative elements being connected to the actuating means and being normally at rest, the reciprocating elements and the cooperative elements being arranged in a plurality of sets, a plurality of connecting elements one on each reciprocating element, a bar, projections on said bar one for each connecting element, means to effect actuation of said bar to render effective the connecting element which happens to be momentarily at rest due to a reversal of motion of the reciprocating element by which the connecting element is carried, and cams one on the end of each projection to assist in properly positioning any one of the connecting elements relatively to its corresponding projection in case the bar is actuated while one of the connecting elements is still moving to its position of momentary rest.

35. In a typewriting machine, the combination of printing instrumentalities including a type carrier, means to actuate said type carrier, power driven means, a plurality of continually reciprocating elements actuated by the power driven means, said elements being arranged with respect to each other to move successively at uniform intervals to a position of momentary rest, a plurality of cooperative elements one for each reciprocating element, said cooperative elements being connected to the actuating means and being normally at rest, the reciprocating elements and the cooperative elements being arranged in a plurality of sets, a plurality of connecting elements one on each reciprocating element, an actuator common to all of the connecting devices, means to effect the operation of said actuator to set the connecting element which happens to be momentarily at the rest due to a reversal of motion of the reciprocating element by which it is carried, a rock shaft to which said cooperative elements are secured, and means operable by said rock shaft to restore said actuator to normal.

36. In a typewriting machine, the combination of printing instrumentalities including a type carrier, means to actuate said type carrier, power driven means, a plurality of continually reciprocating elements actuated by the power driven means, said elements being arranged with respect to each other to move successively at uniform intervals to a position of momentary rest, a plurality of cooperative elements one for each reciprocating element, said cooperative elements being connected to the actuating means and being normally at rest, the reciprocating elements and the cooperative elements being arranged in a plurality of sets, a plurality of connecting elements one on each reciprocating element, a bar, projections on said bar one for each connecting element, means to effect the actuation of said bar to render effective the connecting element which happens to be momentarily at rest due to a reversal of motion of the reciprocating element by which it is carried, a rock shaft to which said cooperative elements are secured, and a cam on said rock shaft to restore said bar to normal.

37. In a typewriting machine, the combination of printing instrumentalities including a type carrier, actuating means whereby the type carrier may be actuated in opposite directions from a normal position to selectively position any one of the types at the printing point, a plurality of continually reciprocating power driven elements, said elements being arranged with respect to each other to reciprocate successively at uniform intervals to a position of momentary rest, a plurality of cooperative elements in alignment with each other and connected to the actuating means, said cooperative elements being normally at rest, two connecting devices on each one of said reciprocating elements, the connecting devices being arranged in two sets and each set being arranged in planes extending transversely of the path of movement of the reciprocating elements, two actuators one for each set of connecting devices, and means to effect the operation of either one of said actuators to effect the actuation of one of the associated set of connecting devices to connect the corresponding reciprocating element with its cooperative element.

38. In a typewriting machine, the combination of printing instrumentalities including a type carrier, actuating means for said type carrier, a rock shaft to operate the actuating means, a continually reciprocating power actuated element, and means whereby the reciprocating element may be connected with said rock shaft while the reciprocating element is momentarily at rest in either of its extreme positions so as to actuate the type carrier in either direction from a normal position.

39. In a typewriting machine, the combination of a type carrier, actuating means for said type carrier, continually running power means, a clutch whereby the actuating means may be connected with the power means, said clutch including a continually reciprocating element driven by the power means, a cooperative clutch element connected to the actuating means, two connecting pawls pivotally supported on the reciprocating clutch element, a normally ineffective slide for each pawl, and means to render either slide effective to thereby actuate the corresponding connecting pawl to connect the reciprocating clutch element with the driven clutch element so that the type carrier actuating means may be operated by said power means in one direction from a normal position when one pawl is actuated, and in the opposite direction from the normal position when the other pawl is similarly actuated to connect the clutch elements.

40. In a typewriting machine, the combination of a type carrier, actuating means for said type carrier, continually running power means, a clutch whereby the actuating means may be connected with the power means, said clutch including a continually reciprocating element driven by the power means, a cooperative clutch element connected to the actuating means, two interponents on one of said clutch elements, two devices to actuate said interponents to connect said clutch elements in either of two positions so that the type carrier may be actuated in opposite directions from a normal position, means associated with each device tending to actuate the latter, holding means for each to prevent actuation of the latter, two sets of key levers, there being one device associated with each set of key levers, and means operable by each set of key levers to render ineffective the holding means for the associated device.

41. In a typewriting machine, the combination of printing instrumentalities including a type carrier, means to actuate said type carrier, power driven means including a continually reciprocating element, a cooperating element connected to the type carrier actuating means, a device on said reciprocating element to connect the latter with said cooperating element so that the actuating means may be driven by the reciprocating element, means to render said device effective while the reciprocating element is momentarily at rest due to a reversal of motion and a locking device carried by said reciprocating element to hold the connecting device in its effective position until the reciprocating element has made a complete cycle.

42. In a typewriting machine, the combination of printing instrumentalities including a type carrier, means to actuate said type carrier, power driven means including a continually reciprocating element, a cooperative element connected to the type carrier actuating means, a device on said reciprocating element to connect the latter with said cooperating element, means to render said device effective while the reciprocating element is momentarily at rest due to a reversal of motion, a locking device carried by said reciprocating element to hold the connecting device in its effective position, means to actuate the locking device to render it ineffective upon the return of said cooperative element to normal, and means to subsequently render the connecting device ineffective.

43. In a typewriting machine, the combination of printing instrumentalities including a type carrier, means to actuate said type carrier, power driven means including a continually reciprocating element, a cooperative element connected to the type carrier actuating means, a connecting pawl pivotally supported on said reciprocating means, a spring tending to hold said pawl in its normal or ineffective position, means to actuate said pawl against the action of said spring to connect the cooperating element with the reciprocating means, a spring pressed latch normally held in its inactive position by said pawl and supported on said cooperating element, said latch being effective after the pawl is actuated to hold the latter in its active position against the action of the spring of said pawl, and means to return said latch to its ineffective position upon the completion of a cycle of the cooperative element to permit said pawl to be returned to its normal position by its associated spring.

44. In a typewriting machine, the combination of printing instrumentalities including a type carrier, actuating means for the type carrier, a continually reciprocating power driven element, the actuating means including a cooperative element, a connecting pawl on the reciprocating element, a setting device, means to effect the actuation of said setting device in a path crosswise of a path in which the pawl is carried bodily by the reciprocating element, and a rigid member on said setting device to engage said pawl to actuate the latter while the reciprocating element is momentarily at rest due to a reversal of motion to connect the cooperative element with the reciprocating element.

45. In a typewriting machine, the combination of printing instrumentalities including a type carrier, actuating means for the type carrier, a continually reciprocating power driven element, the actuating means including a cooperative element, a connecting pawl on the reciprocating element, a setting device, means to effect the actuation of said setting device in a path crosswise of a path in which the pawl is carried bodily by the reciprocating element, a member on said setting device with which the pawl may engage to partially restore said setting device while the reciprocating element is moving toward its position of momentary rest, and means on said cooperative element to permit the actuation of said pawl by said setting device from the partially restored position to thus connect the reciprocatory element with the cooperative element while the reciprocating element is momentarily at rest due to a reversal of motion.

46. In a typewriting machine, the combination of printing instrumentalities including a type carrier, actuating means for the type carrier, a continually reciprocating power driven element, the actuating means including a cooperative element, a connecting pawl on the reciprocating element, a setting device, means to effect the actuation of said setting device in a path crosswise of a path in which the pawl is carried bodily by the reciprocating element, a member on said setting device with which the pawl may engage to partially restore said setting device while the reciprocating element is moving toward its position of rest, means on said cooperative element to permit the actuation of said pawl to its active position by said setting device while the reciprocating element is momentarily at rest due to a reversal of motion, and means to completely restore said setting device while the cooperative element is being driven by the reciprocating element.

47. In a typewriting machine, the combination of printing instrumentalities including a type carrier, actuating means for the type carrier, a continually reciprocating power driven element, the actuating means including a cooperative element which is normally in a position of rest, a connecting pawl on the reciprocating element, a setting device, means to effect the actuation of said setting device in a path crosswise of a path in which the pawl is carried bodily by the reciprocating element, a member on said setting device with which the pawl may engage to partially restore said setting device while the reciprocating element is moving toward its position of rest, means on said cooperative element to permit the actuation of said pawl to its active position by said setting device while the reciprocating element is momentarily at rest due to a reversal of motion, means to lock said pawl in its active position during the cycle of the reciprocating element, means to completely restore said setting device while the cooperative element is being driven by the reciprocating element, and means to render said locking means ineffective upon the return of said cooperative element to normal and means to actuate said pawl to effect a release of the cooperative element from the reciprocating element.

48. In a typewriting machine, the combination of printing instrumentalities including a type carrier, actuating means for the type carrier, a continually reciprocating power driven element, the actuating means including a cooperative element, a connecting pawl pivotally supported on the reciprocating element, a slide, means to effect the actuation of said slide in a plane extending at right angles to the plane in which the pawl is carried bodily by the reciprocating element, a member on said slide to engage said pawl to actuate the latter while the reciprocating element is momentarily at rest due to a reversal of motion to connect the cooperating element with the reciprocating element, a pivoted latch on said reciprocating element to lock said pawl in its actuated or connecting position during a cycle of the reciprocating element, a cam on the cooperative element to restore said slide while the cooperative element is being driven by the reciprocating element, a stop to be engaged by said latch to actuate the latter and thus unlock said pawl, and a spring to restore said pawl to thus disconnect the cooperative element from the reciprocating element.

49. In a typewriting machine, the combination of printing instrumentalities including a type carrier, means to actuate said type carrier, a continually reciprocating element, a cooperative element connected with the actuating means, a connecting device whereby the cooperative element may be connected with the reciprocating element, an actuator to set said connecting device to its effective position, means tending to operate said actuator, holding means to prevent the operation of said actuator, key operated means to actuate said holding means to release said actuator so that the latter may be actuated by the operating means, means to restore said actuator to the control of said holding means, and auxiliary means to hold said actuator in its restored position in case the holding means is retained in its operated position by the key operated means.

50. In a typewriting machine, the combination of printing instrumentalities including a type carrier, means to actuate said type carrier, a continually reciprocating element, a cooperative element connected with the actuating means, a connecting pawl pivotally supported on said reciprocating element and whereby the latter may be connected with the cooperative element, a slide, a spring to actuate said slide to thereby operate said pawl and thus connect the reciprocating element with the cooperative element, a lever to hold said slide in its normal position, a spring to hold said lever in its normal position, key operated means to actuate said lever against the action of its spring to release said slide so that said slide may be actuated by its spring to actuate the connecting pawl, means to restore said slide to the control of said lever, and a pawl pivotally supported on said lever to hold said slide in its restored position in case said lever is retained in its actuated position by the key operated means.

51. In a typewriting machine, the combination of printing instrumentalities including a type carrier, means to actuate said type carrier, a continually reciprocating element, a cooperative element connected with the actuating means, a connecting device whereby the cooperative element may be connected with the reciprocating element, an actuator to set said connecting device to its effective position, means tending to operate said actuator, holding means to prevent the operation of said actuator, a set of key levers, a universal bar operable by any one of the key levers, means operable by said universal bar to actuate said holding means to release said actuator so that the latter may be moved by its associated operating means, means to restore said actuator to the control of said holding means, and means to hold said actuator in its restored position in case the holding means is retained in its operated position due to a delayed return of the depressed key lever to normal.

52. In a typewriting machine, the combination of printing instrumentalities including a type carrier, means to actuate said type carrier, a continually reciprocating element, a cooperative element connected with the actuating means, a connecting pawl pivotally supported on said reciprocating element and whereby the latter may be connected with the cooperative element, a slide, a spring to actuate said slide to thereby operate said pawl and thus connect the reciprocating element with the cooperative element, a lever to hold said slide in its normal position, a spring to hold said lever in its normal position, key operated means to actuate said lever against the action of its spring to release said slide so that said slide may be actuated by its spring to actuate the connecting pawl, and means to restore said slide to the control of said lever.

53. In a typewriting machine, the combination of printing instrumentalities including a variably movable type carrier, means to actuate said type carrier, a continually reciprocating element, a cooperative element connected with the actuating means, a connecting device whereby the cooperative element may be connected with the reciprocating element, an actuator to set said connecting device to its effective position, means tending to operate said actuator, holding means to prevent the operation of said actuator, a set of key levers, means under the control of said key levers to determine the extent of motion of said type carrier, a universal bar operable by any one of the key levers, means operable by said universal bar to actuate said holding means to release said actuator so that the latter may be moved by its associated operating means, and means to restore said actuator to the control of said holding means.

54. In a typewriting machine, the combination of printing instrumentalities including a type carrier, means to actuate said type carrier, a continually reciprocating element, a cooperative element connected with the actuating means, a connecting device whereby the cooperative element may be connected with the reciprocating element, an actuator to set said connecting device to its effective position, means tending to operate said actuator, holding means to prevent the operation of said actuator, key operated means to actuate said holding means to release said actuator so that the latter may be actuated by the operating means, means to restore said actuator to the control of said holding means, auxiliary means to hold said actuator in its restored position in case the holding means is retained in its operated position by the key operated means, and means whereby the auxiliary means is rendered ineffective during the return of the holding means to its holding position.

55. In a typewriting machine, the combination of printing instrumentalities including a type carrier, means to actuate said type carrier, a continually reciprocating element, a cooperative element connected with the actuating means, a connecting pawl pivotally supported on said reciprocating element and whereby the latter may be connected with the cooperative element, a slide, a spring to actuate said slide to thereby operate said pawl and thus connect the reciprocating element with the cooperative element, a lever to hold said slide in its normal position, a spring to hold said lever in its normal position, key operated means to actuate said lever against the action of its spring to release said slide so that said slide may be actuated by its spring to actuate the connecting pawl, means to restore said slide to the control of said lever, a dog pivotally supported on said lever, a spring to actuate said dog to render it effective to hold said slide in its restored position in case said lever is retained in its operated position by the key operated means, said lever being effective during its return to normal to render said dog means ineffective.

56. In a typewriting machine, the combination of printing instrumentalities including a type carrier, means to actuate said type carrier in opposite directions from a normal position to juxtapose any one of the types with respect to the printing point, a power actuated element continually reciprocating between two extreme positions, a cooperative element connected with the actuating means, two connecting devices, one of said connecting devices being effective to connect the cooperative element with the reciprocating element in one extreme position of the latter to drive the cooperative element in one direction from its normal position, the other connecting device being effective to connect the cooperative element with the reciprocating element in its other extreme position, two actuators one for each connecting device, and key operated means for each actuator whereby the operation of the latter may be effected to operate the associated connecting device.

57. In a typewriting machine, the combination of printing instrumentalities including a type carrier, means to actuate said type carrier in opposite directions from a normal position to juxtapose any one of the types with respect to the printing point, a power actuated element continually reciprocating between two extreme positions, a cooperative element connected with the actuating means, two connecting devices, one of said connecting devices being effective to connect the cooperative element with the reciprocating element in one extreme position of the latter to drive the cooperative element in one direction from its normal position, the other connecting device being effective to connect the cooperative element with the reciprocating element in the other extreme position of the reciprocatory element, two actuators one for each connecting device, key operated means for each actuator whereby the operation of the latter may be effected to operate the associated connecting device, two restoring devices one for each actuator to return it to normal, means for each actuator to hold it in its normal position, and means for each connecting device to render it ineffective to disconnect the cooperative element from the reciprocating element.

58. In a typewriting machine, the combination of printing instrumentalities including a type carrier, means to actuate said type carrier in opposite directions from a normal position to juxtapose any one of the types with respect to the printing point, a power actuated element continually reciprocating between two extreme positions, a cooperative element connected with the actuating means, two connecting devices, one of said connecting devices being effective to connect the cooperating element with the reciprocating element in one extreme position of the latter to drive the cooperative element in one direction from its normal position, the other connecting device being effective to connect the cooperative element with the reciprocating element in the other extreme position of the latter, two actuators one for each connecting device, two sets of key levers, two universal bars, one for each set of key levers, each universal bar being operable by any one of the set of key levers associated therewith, means operable by each universal bar to effect the actuation of the associated actuator to thereby actuate the associated connecting device to thus connect said elements so as to actuate the type carrier in the desired direction.

59. In a typewriting machine, the combination of a type carrier, actuating means for said type carrier to juxtapose any one of the types with respect to the printing point, said actuating means including a rock shaft, a driven element secured to said rock shaft, a driving element mounted on said rock shaft for reciprocatory movement independent of said shaft, continually running power means to operate said driving element, means whereby the driven element may be connected with the driving element to thereby actuate said rock shaft and the connected type bar carrier, a printing element to cooperate with the juxtaposed type to cause it to print, and means operable by said rock shaft to actuate said printing element.

60. In a typewriting machine, the combination of a type carrier, actuating means to operate said type carrier in opposite directions from a normal position, continually running power means, a clutch whereby the actuating means may be connected with said power means, said clutch including a continually reciprocating element operable by said power means, and a driven clutch element connected with said actuating means, means to connect said driven clutch element with said reciprocating clutch element in either one of two extreme opposite positions of said reciprocating element so that the driven element may be actuated in opposite directions from a normal position to correspondingly operate the actuating means and the type carrier, a printing element to cooperate with the types on the type carrier, and means operable by the actuating means when the latter is operated in either direction to operate said printing element.

61. In a typewriting machine, the combination of printing instrumentalities including a type carrier having a plurality of types thereon and operable in opposite directions from a normal position to juxtapose any one of the types at the printing point, and a cooperative printing element, actuating means for said type carrier, means to operate said actuating means in opposite directions from a normal position, and means operable by said actuating means irrespective of its direction of movement from its normal position to drive said cooperative printing element always in the same direction.

62. In a typewriting machine, the combination of printing instrumentalities including a type carrier having a plurality of types thereon and operable in opposite directions from a normal position to juxtapose any one of the types at the printing point, and a cooperative printing element, actuating means for said type carrier, said actuating means including a rock shaft, means to actuate said rock shaft in opposite directions from its normal position to accordingly operate the type carrier, and means operable by said rock shaft irrespective of its direction of rotation from its normal position to drive said cooperative printing element always in the same direction.

63. In a typewriting machine, the combination of printing instrumentalities including a type carrier having a plurality of types thereon and operable in opposite directions from a normal position to juxtapose any one of the types at the printing point, and a cooperative printing element, actuating means for said type carrier, means to operate said actuating means in opposite directions from a normal position, and means operable in any one of two opposite directions from a normal position by said actuating means to actuate said cooperative element always in the same direction.

64. In a typewriting machine, the combination of printing instrumentalities including a type carrier having a plurality of types thereon and operable in opposite directions from a normal position to juxtapose any one of the types at the printing point, and a cooperative printing element, a rock shaft, means to reciprocate said rock shaft in either of two directions from a normal position, means operable by said rock shaft to actuate said type carrier, an arm secured to said rock shaft, a link connected at one end to said arm and extending in the same direction as said arm, a lever connected to the opposite end of said link, and means operable by said lever to actuate said cooperative printing element.

65. In a typewriting machine, the combination of printing mechanism including a type carrier, means to actuate the type carrier and return it to normal, a continually reciprocating power driven element, a cooperative element, means to connect the driven element with the reciprocating element while the latter is momentarily at rest due to a reversal of motion, and means to prevent accidental displacement of the driven element from its normal position.

66. In a typewriting machine, the combination of printing mechanism including a type carrier, means to actuate the type carrier and return it to normal, a continually reciprocating power driven element, said means including a shaft upon which said reciprocating element is pivotally supported to oscillate independently thereof, a cooperative element secured to said shaft, a connecting device supported on one of said elements, means to actuate said connecting device to connect the cooperative element with said reciprocating element while the latter is momentarily at rest due to a reversal of motion, and a spring acting on said shaft to prevent accidental displacement of the cooperative element.

67. In a typewriting machine, the combination of printing mechanism including a type carrier, means to actuate the type carrier in opposite directions from a normal position and to return it to normal, a continually reciprocating power driven element, a cooperative element connected to the type carrier actuating means, means to connect the cooperative element with the reciprocating element in either one of the extreme opposite positions of the reciprocating element while the latter is momentarily at rest due to a reversal of motion, and means to prevent accidental displacement of said cooperative element in either direction from its normal position.

68. In a typewriting machine, the combination of printing mechanism including a type carrier, means to actuate the type carrier in opposite. directions from a normal position and to return it to normal, a continually reciprocating power driven element, said means including a shaft upon which said reciprocating element is pivotally supported to oscillate independently thereof, a cooperative element secured to said shaft, two connecting devices on the reciprocating element, means to actuate said connecting devices one at a time while the reciprocating element is in either one of its extreme positions and temporarily at rest due to a reversal of motion, and a two way acting spring tending to prevent accidental displacement of the cooperative element from its normal position.

69. In a typewriting machine, the combination of a type carrier having type members thereon, actuating means to operate said type carrier in opposite directions from a normal position to juxtapose any one of the type members with respect to the printing point, a printing element to cooperate with the juxtaposed type member, and means driven by said actuating means irrespective of the direction of its motion to drive the printing element.

70. In a typewriting machine, the combination of a type carrier having type members thereon, actuating means to operate said type carrier in opposite directions from a normal position to juxtapose any one of the type members with respect to the printing point, a printing element to cooperate with the juxtaposed type member, said actuating means including a rock shaft operable in opposite directions in accordance with the actuation of said type carrier, and means driven by said rock shaft irrespective of its direction of rotation to drive said printing element.

71. In a typewriting machine, the combination of a type carrier having type members thereon, actuating means to operate said type carrier in opposite directions from a normal position to juxtapose any one of the type members with respect to the printing point, a printing element to cooperate with the juxtaposed type member, said actuating means including a rock shaft operable in opposite directions in accordance with the actuation of said type carrier, means including a pivoted element to actuate the printing element, an arm secured to said rock shaft and swingable thereby in opposite directions from a normal position, a link connecting said arm with said pivoted element so that said pivoted element may be actuated always in the same direction by said arm irrespective of the direction of actuation of the latter from its normal position.

72. In a typewriting machine, the combination of a type carrier having a plurality of type thereon, rotatable means whereby the type carrier may be actuated in opposite directions from a normal position to juxtapose any one of the types at a printing point, means including a cam element to actuate the rotating means, a rock shaft to which said cam is secured, means to actuate said rock shaft in opposite directions to accordingly actuate said type carrier, a printing element to cooperate with the juxtaposed type, and means operable by said rock shaft to actuate said printing element.

73. In a typewriting machine, the combination of a type carrier having a plurality of types thereon, rotatable means whereby the type carrier may be actuated in opposite directions from a normal position to juxtapose any one of the types at a printing point, a cam element, intermediate means connecting said cam element with said rotating means, continually running power means, a clutch whereby the cam element may be connected to said power means, said clutch including a continually reciprocating element operable by the power means, and a cooperative element normally at rest and connected to said cam element, means to connect said cooperative element with said reciprocating element in either one of the extreme opposite positions of the reciprocating element so that the cooperative element may be actuated in opposite directions from a normal position to correspondingly actuate said intermediate means and the type carrier, and means to effect the actuation of the clutch connecting means.

74. In a typewriting machine, the combination of a type carrier having a plurality of types thereon, rotatable means whereby the type carrier may be actuated in opposite directions from a normal position to juxtapose any one of the types at a printing point, a cam element operable in either one of two opposite directions from a normal position, a lever operable by said cam element to actuate said type carrier, the extent of motion imparted to said lever by said cam being always the same, fulcrum means for said lever, fulcrum varying means to vary the extent of movement imparted by said lever to said type carrier, continually running power means, a clutch whereby the cam element may be connected to said power means, said clutch including a continually reciprocating element operable by the power means, and a cooperative element normally at rest and connected to said cam element, and means to connect said cooperative element with said reciprocating element in either one of the extreme opposite positions of the reciprocating element so that the cooperative element may be actuated in opposite directions from a normal position to correspondingly actuate said intermediate means and the type carrier, and means to effect the actuation of the clutch connecting means.

75. In a typewriting machine, the combination of printing instrumentalities including a type carrier having a plurality of adjacent types thereon, an actuating lever, means to operate the latter, means operable by said lever to set the type carrier to juxtapose any one of the types with respect to the printing point, fulcrum devices for said lever whereby the throw imparted by said lever may be varied to move the type carrier more or less in accordance with the distance of the types from the printing point, bars, one for each fulcrum device, rock shafts extending transversely of said bars, means connecting each rock shaft with one of the bars, key levers one for each rock shaft, means whereby each rock shaft may be actuated by its associated key lever to actuate the corresponding bar, means operable by each bar to set the associated fulcrum device, and means to actuate said lever about the set fulcrum device.

76. In a typewriting machine, the combination of printing instrumentalities including a type carrier having a plurality of adjacent types thereon, an actuating lever extending fore-and-aft of the machine, means to operate said lever in a horizontal plane, means operable by said lever to set the type carrier to juxtapose any one of the types with respect to the printing point, a set of fulcrum pins for said lever whereby the throw imparted by said lever may be varied to move the type carrier in accordance with the desired type, each pin extending vertically and the set of pins being arranged lengthwise of said lever, bars, one for each fulcrum pin, said bars extending transversely of the machine, rock shafts extending transversely of said bars, means connecting each rock shaft with one of the bars, key levers one for each rock shaft with one of the bars, key levers one for each rock shaft and extending parallel to said rock shafts, means whereby each rock shaft may be actuated by its associated key lever to actuate the corresponding bar, means operable by each bar to set the associated fulcrum pin, and means to actuate said lever about the set fulcrum pin.

77. In a typewriting machine, the combination of printing instrumentalities including a type carrier having a plurality of adjacent types thereon, an actuating lever extending fore-and-aft of the machine, means to operate said lever in a horizontal plane, means operable by said lever to set the type carrier to juxtapose any one of the types with respect to the printing point, a set of fulcrum pins for said lever whereby the throw imparted by said lever may be varied to move the type carrier through distances corresponding to the distances of the various types from the printing point, each pin extending vertically and the set of pins being arranged lengthwise of said lever, bars, one for each fulcrum pin, said bars extending transversely of the machine, bell cranks connecting each pin with one of said bars, and key operated means to actuate any one of said bars to set the associated fulcrum pin.

78. In a typewriting machine, the combination of printing instrumentalities including a type carrier having a plurality of adjacent types thereon, an actuating lever extending fore-and-aft of the machine, means to operate the latter in a horizontal plane, means operable by said lever to set the type carrier to juxtapose any one of the types with respect to the printing point, a set of fulcrum pins for said lever whereby the throw imparted by said lever may be varied to move the type carrier through distances corresponding to the distances of the various types from the printing point, each pin extending vertically and the set of pins being arranged lengthwise of said lever, bars, one for each fulcrum pin, said bars extending transversely of the machine, bell cranks connecting each pin with one of said bars, key operated means to actuate any one of said bars to set the associated fulcrum pin, and key operated means to effect the actuation of said lever after one of the fulcrum pins has been set.

79. In a typewriting machine, the combination of printing instrumentalities including a type carrier having a plurality of adjacent types thereon, the types being arranged at both sides of the printing point, an actuating lever, means to operate the latter in either of two opposite directions from a normal position, means operable by said lever to set the type carrier to juxtapose any one of the types at the printing point, fulcrum devices for said lever whereby the throw imparted by said lever may be varied to move the type carrier more or less in accordance with the distances of the various types from the printing point, there being half as many fulcrum devices as there are adjacent types on the type carrier, setting devices one for each fulcrum device, bars one for each setting device, rock shafts two for each bar, and key levers one for each rock shaft each key lever being effective to actuate its associated rock shaft to thereby operate the bar associated with the rock shaft and thus actuate the setting device associated with the bar.

80. In a typewriting machine, the combination of a shuttle, type bars on said shuttle, means to actuate said shuttle to juxtapose any one of the type bars at the printing point, a type bar actuator to operate any one of said type bars to print after it has been juxtaposed, power means, intermediate means through the medium of which the type bar actuator may be operated by said power means, the shuttle actuating means being also operable by said power means, a ribbon vibrator, and means operable by said intermediate means to actuate said ribbon vibrator.

81. In a typewriting machine, the combination of printing instrumentalities including a type carrier having types arranged side-by-side thereon, power means, means reciprocable by the power means to actuate the type carrier from its normal position and to return it to its normal position, a ribbon vibrator, and means operable by the reciprocable means to actuate said ribbon vibrator to its effective position and to return it to its ineffective position.

82. In a typewriting machine, the combination of printing instrumentalities including a type carrier having types arranged side-by-side thereon, means to actuate said type carrier in opposite directions from a normal position to register any one of the types with the printing point, power means, intermediate means operable in either of two opposite directions from a normal position by said power means to operate the type carrier actuating means, a ribbon vibrator, and means operable by the intermediate means irrespective of its direction of movement from its normal position to actuate said ribbon vibrator always in the same direction to its effective position.

83. In a typewriting machine, the combination of printing instrumentalities including a type carrier having types arranged side-by-side thereon, means to actuate said type carrier in opposite directions from a normal position to register any one of the types with the printing point, power means, intermediate means operable in either of two opposite directions from a normal position by said power means to operate the type carrier actuating means, said printing instrumentalities including also an actuator, means operable by said intermediate means irrespective of the direction of movement of the latter from its normal position to operate said actuator always in the same direction, a ribbon vibrator, and means actuatable by the operable means to actuate said ribbon vibrator.

84. In a typewriting machine, the combination of printing instrumentalities including a type carrier having types arranged side-by-side thereon, power means, means reciprocable by the power means to actuate the type carrier to its printing position and to return it to its ineffective position, a carriage, an escapement for said carriage, and means operable by the reciprocable means to actuate said escapement and return it to normal from its actuated position.

85. In a typewriting machine, the combination of printing instrumentalities including a type carrier having types arranged side-by-side thereon, means to actuate said type carrier in opposite directions from a normal position to register any one of the types with the printing point, power means, intermediate means operable in opposite directions from a normal position by said power means to operate the type carrier actuating means, a carriage, an escapement for said carriage, and means operable by the intermediate means irrespective of its direction of movement from its normal position to actuate said escapement always in the same direction to its effective position.

86. In a typewriting machine, the combination of printing instrumentalities including a type carrier having types arranged side-by-side thereon, means to actuate said type carrier in opposite directions from a normal position to register any one of the types with the printing point, power means, intermediate means operable in opposite directions from a normal position by said power means to operate the type carrier actuating means, said printing instrumentalities including also an actuator, means operable by said intermediate means irrespective of the direction of movement of the latter from its normal position to operate said actuator always in the same direction, a carriage, an escapement for said carriage, and means actuatable by the operable means to actuate said escapement.

87. In a typewriting machine, the combination of a carriage, printing instrumentalities including type bars, and a type bar actuator, power means, intermediate means through the medium of which the type bar actuator may be operated by said power means to its effective position and whereby the actuator is returned to its ineffective position, a ribbon vibrator, carriage propelling means, carriage feeding means, and means operable by said intermediate means to actuate said ribbon vibrator and said carriage feeding means to their effective positions and to return them to their ineffective positions.

88. In a typewriting machine, the combination of printing instrumentalities including a type carrier having types arranged side-by-side thereon, means to actuate said type carrier in opposite directions from a normal position to register any one of the types with the printing point, power means, intermediate means operable in opposite directions from a normal position by said power means to operate the type carrier actuating means, a ribbon vibrator, a carriage, carriage feeding means, and means operable by the intermediate means irrespective of its direction of movement from its normal position to actuate said ribbon vibrator and said carriage feeding means.

89. In a typewriting machine, the combination of printing instrumentalities including a type carrier having types thereon, rotatable means to actuate said type carrier to juxtapose any one of the types with respect to the printing point, a lever cooperating at one of its ends with the rotating means to drive the latter, means engaging the opposite end of the lever to actuate the latter in opposite directions from a normal position, fulcrum pins for said lever, said lever having apertures one for each fulcrum pin, said pins being normally out of engagement with said lever, means to set any one of said pins into the corresponding aperture of said lever, and resilient means acting on the driving end of said lever to hold the latter in its normal position to prevent accidental swinging thereof so as to keep the apertures in register with said pins.

90. In a typewriting machine, the combination of printing instrumentalities including a type carrier having types thereon, a rotatable shaft to actuate said type carrier in opposite directions from a normal position to juxtapose any one of the types with respect to the printing point, actuating means to rotate said shaft, said actuating means including a lever, fulcrum means for said lever and normally out of engagement therewith, means to set said fulcrum means into engagement with said lever, and two oppositely acting springs acting on said shaft to prevent accidental displacement of said lever with respect to the fulcrum means.

91. In a typewriting machine, the combination of printing instrumentalities including a type carrier having types thereon, a rotatable shaft to actuate said type carrier in opposite directions from a normal position to juxtapose any one of the types with respect to the printing point, actuating means to rotate said shaft, said actuating means including a lever, fulcrum means for said lever and normally out of engagement therewith, means to set said fulcrum means into engagement with said lever, two springs coiled about said shaft and acting to rotate said shaft in opposite directions, two stationary devices each serving to anchor one end of each spring, two collars secured to said shaft, each collar having a member engaged by the opposite end of the spring to limit the action of said spring to rotate said shaft, and a collar secured to said shaft, the opposite end of each spring acting against said collar to hold said shaft in its normal position and thus prevent accidental displacement of said lever with respect to the fulcrum means.

92. In a typewriting machine, the combination of printing instrumentalities including a type carrier, actuating means for said type carrier, said actuating means including a lever extending fore-and-aft of the machine, variable fulcrum means for said lever, a rock shaft extending transversely of the machine and located under the forward end of said lever, means to actuate said rock shaft, and a cam on said rock shaft to actuate said lever.

93. In a typewriting machine, the combination of printing instrumentalities including a type carrier, actuating means for said type carrier, said actuating means including a lever extending fore-and-aft of the machine, variable fulcrum means for said lever, a rock shaft extending transversely of the machine and located under the forward end of said lever, means to rock said shaft in opposite directions from a normal position, and a cam element secured to said shaft and engaging the forward end of said lever to actuate the latter in opposite directions from a normal position.

94. In a typewriting machine, the combination of printing instrumentalities having two kinds of types namely upper case types and lower case types, a ribbon, ribbon vibrating means, said ribbon being normally in a position for printing with one of the sets of types, case shifting means, and means operable by the case shifting means to render the ribbon vibrating means temporarily ineffective.

95. In a typewriting machine, the combination of printing instrumentalities including type bars, each type bar having an upper case type and a lower case type thereon, the types being arranged on each bar so that they are disposed one under the other while the type bar is in printing position, case shifting means, a ribbon vibrator having a ribbon normally in the path of one of the types, means to actuate said ribbon vibrator, and means operable by the case shifting means to render the actuating means ineffective.

96. In a typewriting machine, the combination of printing instrumentalities including type bars, each type bar having an upper case type thereon and a lower case type thereon, the latter being so positioned with respect to the lower case type as to be above the latter while the type bar is in its printing position, a platen normally in its upper position for printing of the lower case types, means to shift the platen downwardly for printing of the upper case types, a ribbon vibrator having a ribbon normally positioned in the path of the upper case types, means to actuate said ribbon vibrator, and means operable by the platen shifting means while shifting the platen downwardly to its upper case position to render the actuating means ineffective.

97. In a typewriting machine, the combination of printing instrumentalities including type bars, each type bar having an upper case type and a lower case type thereon, the types being arranged on each bar so that they are disposed one under the other while the type bar is in printing position, case shifting means, a ribbon vibrator having a ribbon normally in the path of one of the types, a carriage, an escapement for said carriage, means to actuate said ribbon vibrator and the escapement, and means operable by the case shifting means to prevent the actuation of the ribbon vibrator while printing with the upper case type.

98. In a typewriting machine, the combination of printing instrumentalities including type bars, each type bar having an upper case type thereon and a lower case type thereon which is so positioned with respect to the lower case type as to be above the latter while the type bar is in its printing position, a platen normally in its upper position for printing of the lower case types, means to shift the platen downwardly for printing of the upper case types, a ribbon vibrator having a ribbon normally positioned in the path of the upper case types, a carriage, an escapement for said carriage, actuating means for said ribbon vibrator, actuating means for said escapement, means to operate both of said actuating means simultaneously, and means operable by said platen shifting means while shifting the platen downwardly to its upper case position to render the actuating means for the ribbon vibrator ineffective.

99. In a typewriting machine, the combination of a platen, type bars to print against said platen, a pressure element to press any one of the type bars against said platen, continually running power means, reciprocable means connectable at will with said power means and to be driven thereby through a complete cycle, means to disconnect the reciprocable means at the completion of a cycle from the power means, means including a lever of the first order operable by the reciprocable means always through the same extent to actuate said pressure element to its effective position and to return it to its ineffective position, a pivot for said lever, and means to vary the position of said pivot to thus vary the position at which the engaging end of said pressure element may come to rest when operated in accordance with the thickness of paper around the platen, and means to bring any one of the type bars into cooperative relation with said actuator.

100. In a typewriting machine, the combination of a platen, type bars to print against said platen, a pressure element to press any one of the type bars against said platen, continually running power means, reciprocable means connectable at will with said power means, means to disconnect the reciprocable means at the completion of a cycle from the power means, means including a lever of the first order operable by the reciprocable means always through the same extent to actuate said pressure element, a pivot for said lever, and resilient means to prevent distortion of the pressure element or its associated parts in case there is an excessive thickness of work sheets around the platen, and means to bring any one of the type bars into cooperative relation with said actuator.

101. In a typewriting machine, the combination of printing instrumentalities including a type carrier, rotatable means to set the type carrier, means including a lever to actuate said rotatable means, a series of fulcrum pins for said lever, said fulcrum pins being arranged in a row extending lengthwise of said lever, apertures in said lever one for each fulcrum pin, and a guide plate to prevent accidental displacement of said lever lengthwise of itself and relative to the fulcrum pins while said lever is in its normal position.

102. In a typewriting machine, the combination of printing instrumentalities including a type carrier, rotatable means to set the type carrier, means including a lever to actuate said rotatable means, a series of fulcrum pins for said lever, said fulcrum pins being arranged in a row extending lengthwise of said lever, apertures in said lever one for each fulcrum pin, projections on said lever, and a fixed plate engaging between said projections to prevent accidental displacement of said lever lengthwise of itself and relative to the fulcrum pins while said lever is in its normal position.

103. In a typewriting machine, the combination of printing instrumentalities including a type carrier, rotatable means to set the type carrier, means including a lever to actuate said rotatable means a series of fulcrum pins for said lever, said fulcrum pins being arranged in a row extending lengthwise of said lever, apertures in said lever one for each fulcrum pin, means at one end of said lever and resilient means at the other end of said lever to prevent accidental pivotal movement of said lever so to prevent disalignment of said apertures with respect to the fulcrum pins, and means including a guide to hold said lever against longitudinal displacement to prevent disalignment of the apertures with respect to the fulcrum pins.

104. In a typewriting machine, the combination of printing instrumentalities including a type carrier, two sets of types on said carrier one set at each side of the printing point, means to actuate said type carrier in either one of two opposite directions from a normal position to juxtapose any one of the types of either set at the printing point, continually running power means, a driving element connected to the power means, a driven element normally at rest and connected with the type carrier actuating means, two sets of key levers, two sets of mechanism one set for each set of key levers, means operable by said sets of mechanism to differently connect the driven element with the driving element so that the type carrier actuating means may be actuated in one direction or the other from its normal position by the power means.

105. In a typewriting machine, the combination of printing instrumentalities including a type carrier, two sets of types on said carrier one set at each side of the printing point, means to actuate said type carrier in either one of two opposite directions from a normal position to juxtapose any one of the types in the two sets at the printing point, continually running power means, a driving element connected to the power means, a driven element normally at rest and connected with the type carrier actuating means, two sets of key levers, two universal bars one for each set of key levers, means including two devices one for each universal bar and whereby the type carrier actuating means may be connected variously with said power means to effect actuation of said type carrier in either of two opposite directions from its normal position, and means operable by each universal bar whereby the associated device may be actuated to render it effective.

106. In a typewriting machine, the combination of a type carrier having a type thereon, means to actuate said type carrier to locate the type at the printing point, the actuating means including a cam being normally in an ineffective position, a continually reciprocating power device, a key lever, and means operable by the key lever to effect a connection of the cam with the reciprocating power device while the latter is momentarily at rest due to a reversal of motion so that the reciprocating device may drive said cam to its actuated position and restore it to its normal position.

107. In a typewriting machine, the combination of a type carrier having a type thereon, means to actuate said type carrier to locate the type at the printing point, the actuating means including a cam normally in an ineffective position, a continually reciprocating power device, means to connect said cam with the reciprocating power device while the latter is momentarily at rest due to a reversal of motion, a key lever, means operable by the key lever to effect the actuation of said connecting means so that said power device may drive said cam to its effective position and restore it to normal, and means to render the connecting means inactive upon the return of said cam to normal.

108. In a typewriting machine, the combination of a type carrier having a type member thereon, means to actuate said type carrier to locate the type member at the printing point, the actuating means including a cam normally in an ineffective position, a continually reciprocating power device, a cooperative device to engage the type carrier to cause it to print, a key lever, means operable by the key lever to effect a connection of the cam with the reciprocating power device to drive said cam to its effective position and restore it to normal, and means operable by the power device to actuate said cooperative device to cause the type member to print, said cam having a dwell to permit the actuation of the cooperative device and thus perform the printing after the type has been located at the printing point.

109. In a typewriting machine, the combination of a type carrier having a type thereon, rotatable means to actuate said type carrier to juxtapose the type at the printing point, a cooperative element to engage the type to print, means including a lever to actuate the rotatable means, a cam to actuate said lever, a continually reciprocating power driven device, a key lever, means operable by said key lever to effect a connection of the reciprocating device with said cam to actuate the latter and thus actuate said lever, and means operable by the reciprocating device to actuate the cooperative element to print.

110. In a typewriting machine, the combination of a type carrier having a type thereon, means to rotate the type carrier to juxtapose the type at the printing point, a cam, a continually reciprocating power driven device, a key lever, a pivoted frame operable by the key lever, and means operable by said frame to effect a connection of said cam with the reciprocating device.

111. In a typewriting machine, the combination of a type carrier having a type thereon, means to actuate said type carrier to juxtapose the type at the printing point, means to accurately register the type after it has been juxtaposed, means to cause the type to print after it has been accurately registered, a cam to operate the type carrier actuating means, a continually reciprocating device, a key lever and means operable by the key lever to effect a connection with the cam and the printing means, the type registering means being associated with the printing means, said cam having a dwell to permit the type carrier actuating means to be at rest in its operated position while the registering means and the printing means are functioning.

112. In a typewriting machine, the combination of a type carrier having a type thereon, means to actuate the type carrier to juxtapose the type at the printing point, a cooperative element to cause the type to print, a continually reciprocating power driven device, means including an element to connect the actuating means with the reciprocating device, a holding device for said element, a key lever, means operable by the key lever to actuate said holding device to render it ineffective, and means to subsequently actuate said element to effect a connection of the actuating means with the reciprocating device.

113. In a typewriting machine, the combination with a rotary type carrier, of means to cause the type carrier to rotate with diminishing intensity as it approaches its effective position, said type carrier being rotatable in opposite directions from a home position, said means including a cam element operable in two opposite directions from a home position to correspondingly actuate the type bar carrier.

114. In a typewriting machine, the combination with a rotary type carrier, of means to cause the type carrier to rotate with diminishing intensity as it approaches its effective position, said type carrier being rotatable in opposite directions from a home position, said means including a cam element operable in two opposite directions from a home position to correspondingly actuate the type bar carrier, power means to drive said cam, and selectively settable means to connect the power means with said cam element and to determine the direction in which the cam element should be moved from its home position by the power means.

115. In a typewriting machine, the combination with a rotary type carrier, of means to cause the type carrier to rotate with diminishing intensity as it approaches its effective position, said means including a cam, and a rock shaft upon which said cam is rigidly supported, aligning means for said type bar carrier, and means operable by said rock shaft to actuate the aligning means.

116. In a typewriting machine, the combination of a type carrier having types thereon, means to rotate said type carrier to register one of its types with the printing point, a continually reciprocating power driven device, means to connect the rotating means with the reciprocating device, means to operate the connecting means, means tending to actuate the operating means, means to hold the operating means, key levers, and means operable by any one of the key levers to actuate the holding means to thus release the operating means so that it may be operated by its actuating means to thus actuate the connecting means to its active position so that the type carrier rotating means may be actuated by the power driven device.

CHARLES A. FUCHS.